United States Patent
Matsumoto et al.

(10) Patent No.: US 7,424,732 B2
(45) Date of Patent: Sep. 9, 2008

(54) CARD SETTLEMENT METHOD AND SYSTEM USING MOBILE INFORMATION TERMINAL

(75) Inventors: Tsutomu Matsumoto, Kawasaki (JP);
Hiroki Mitsumoto, Kawasaki (JP);
Takeshi Kamata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 625 days.

(21) Appl. No.: 09/810,437

(22) Filed: Mar. 19, 2001

(65) Prior Publication Data
US 2002/0066042 A1   May 30, 2002

(30) Foreign Application Priority Data
Nov. 24, 2000   (JP)   ............................. 2000-358016

(51) Int. Cl.
*H04L 9/32*   (2006.01)
(52) U.S. Cl. .................................... 726/2; 726/3; 726/9
(58) Field of Classification Search ................ 713/200, 713/202, 178, 153, 183, 192; 705/39, 53, 705/41, 64–67; 726/20–21, 2–5, 9
See application file for complete search history.

(56) References Cited

U.S. PATENT DOCUMENTS

| | | | |
|---|---|---|---|
| 5,434,395 A | | 7/1995 | Storck et al. |
| 5,883,810 A | * | 3/1999 | Franklin et al. ............. 700/232 |
| 6,016,476 A | * | 1/2000 | Maes et al. ..................... 705/1 |
| 6,078,908 A | | 6/2000 | Schmitz |
| 6,205,437 B1 | * | 3/2001 | Gifford ........................ 705/75 |

(Continued)

FOREIGN PATENT DOCUMENTS

EP   0 438 930 A1   7/1991

(Continued)

OTHER PUBLICATIONS

"Card Wave", Sep. 2000, vol. 13, No. 9 (partial translation of p. 32).

*Primary Examiner*—Hosuk Song
(74) *Attorney, Agent, or Firm*—Kratz, Quintos & Hanson, LLP

(57) ABSTRACT

A card settlement method using a mobile information terminal provided with an IC card read/write function and a wireless communication function for the settlement of a transaction in a business establishment, comprising a step of having a customer using a business establishment wirelessly connect to an authorization server through a network by the mobile information terminal, a step of having the customer load his or her IC card in the mobile information terminal, read the information stored in this IC card, and send it to the authorization server, a step of having the authorization server decide on the authorization of the current transaction from authentication information stored in the IC card and proving the legitimacy of the card, settlement information containing at least a card number, and personal identification information input from the customer and proving the legitimacy of the customer, a step of sending a temporary password issued from a settlement server to the mobile information terminal for display after the authorization of the current transaction, a step of inputting the temporary password and the current transaction information from a business establishment side settlement terminal and sending it to the settlement server, and a step of having the settlement server settle the transaction with the password and the transaction information satisfying the settlement conditions.

12 Claims, 16 Drawing Sheets

U.S. PATENT DOCUMENTS

| | | | |
|---|---|---|---|
| 6,260,024 B1 * | 7/2001 | Shkedy | 705/37 |
| 6,474,544 B2 * | 11/2002 | Di Giorgio et al. | 235/379 |
| 6,592,032 B1 * | 7/2003 | Takaragi et al. | 235/382 |
| 6,955,299 B1 * | 10/2005 | Pathmasuntharan et al. | 235/492 |
| 2001/0037308 A1 * | 11/2001 | Kotlarsky | 705/64 |
| 2003/0028481 A1 * | 2/2003 | Flitcroft et al. | 705/39 |

FOREIGN PATENT DOCUMENTS

| | | |
|---|---|---|
| EP | 1 014 317 A1 | 6/2000 |
| JP | 9-288696 | 11/1997 |
| JP | 10-255121 | 9/1998 |
| JP | 11-203358 | 7/1999 |
| JP | 2000-10927 | 1/2000 |
| JP | 2000-11069 | 1/2000 |
| JP | 2000-276531 | 10/2000 |
| WO | WO 98/37523 | 8/1998 |
| WO | WO 00/49586 | 8/2000 |

* cited by examiner

MOBILE INFORMATION TERMINAL

Fig. 2A CONTACT TYPE IC CARD R/W BUILT-IN
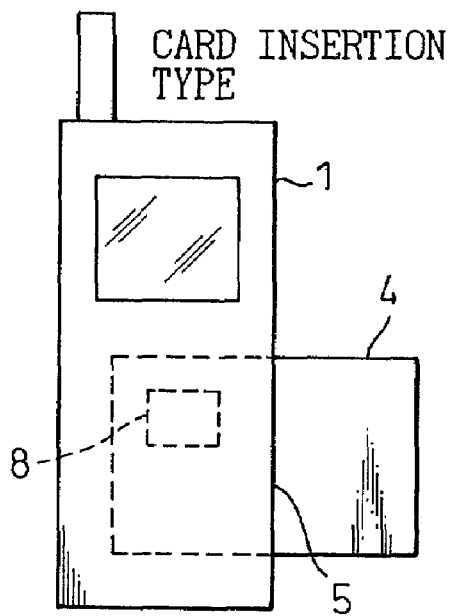
Fig. 2B
USE CARD INSERTION TYPE AND BUILT-IN TYPE TOGETHER
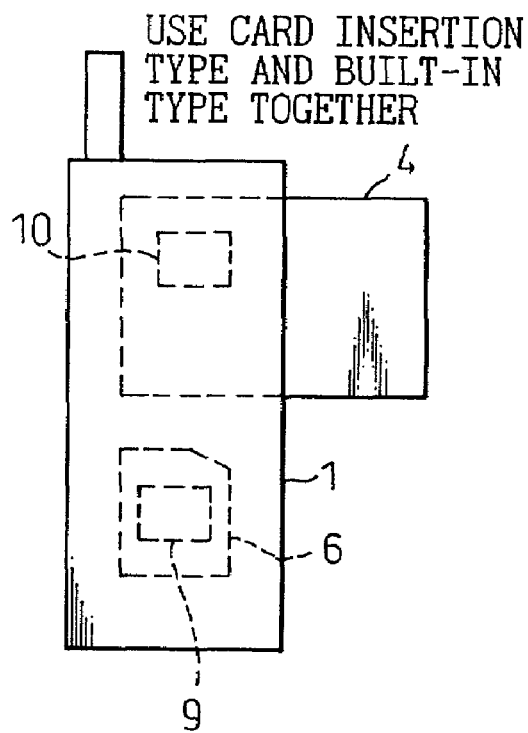
Fig. 2C
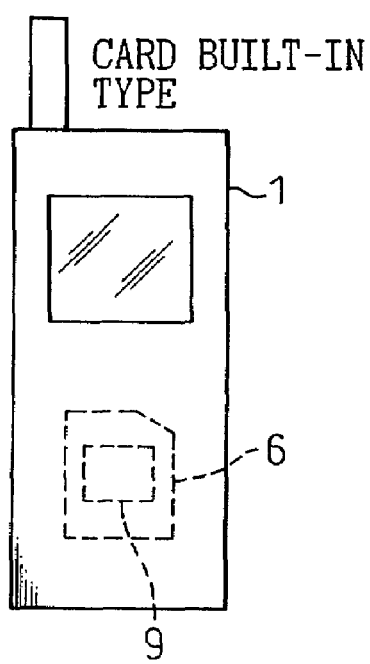

NONCONTACT TYPE IC CARD R/W BUILT-IN

BOTH OF CONTACT TYPE IC CARD R/W AND
NONCONTACT TYPE IC CARD R/W BUILT-IN

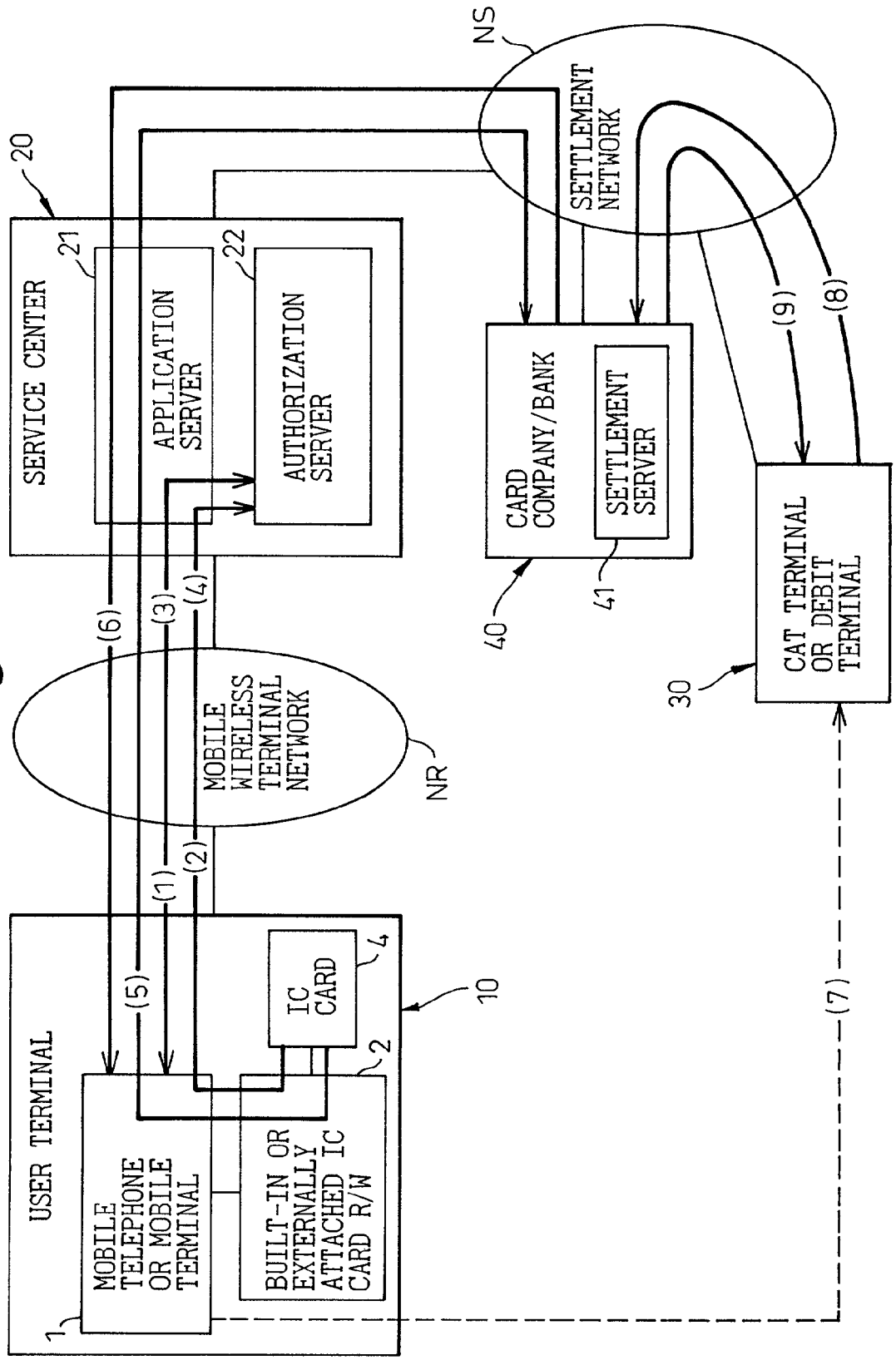

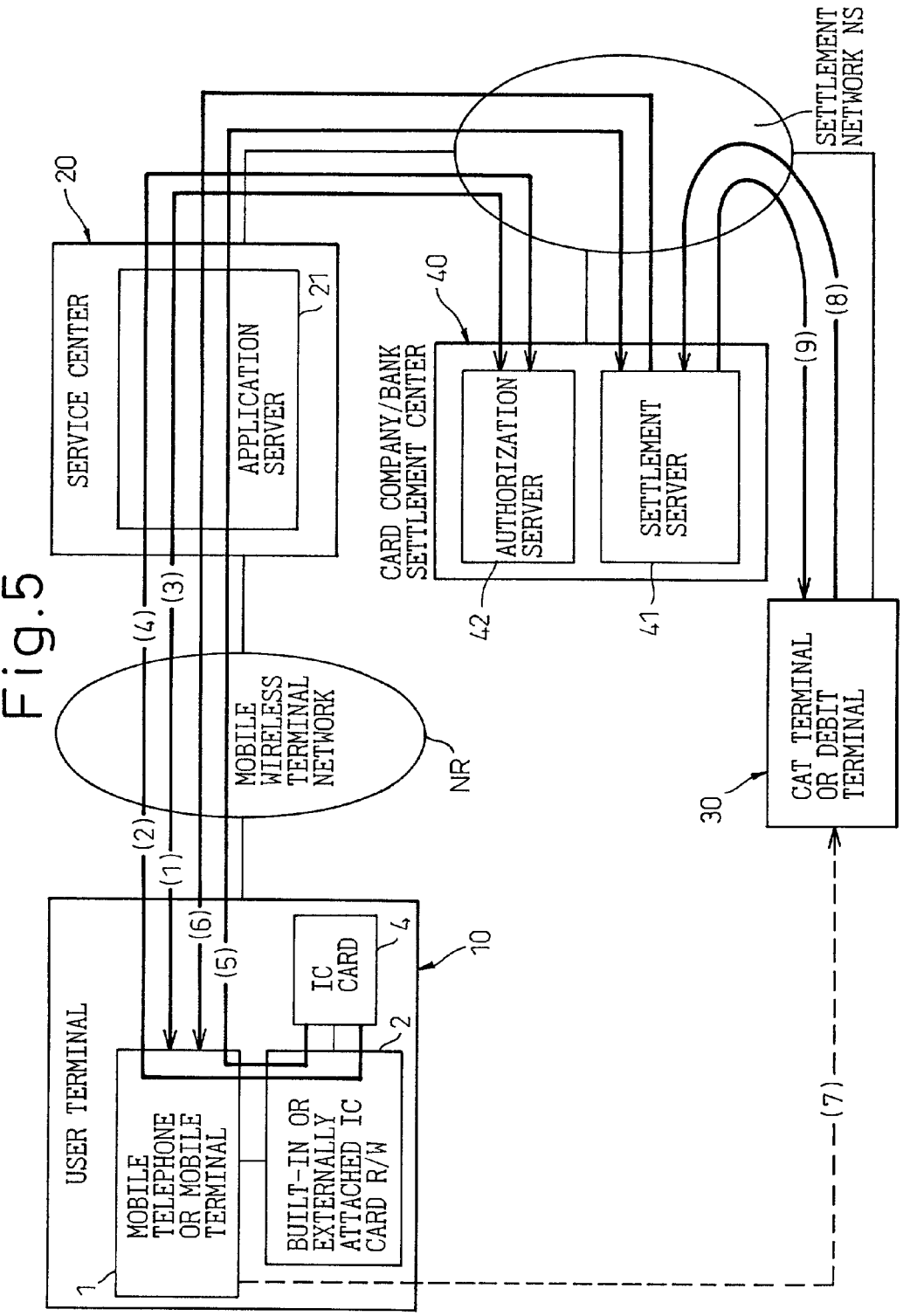

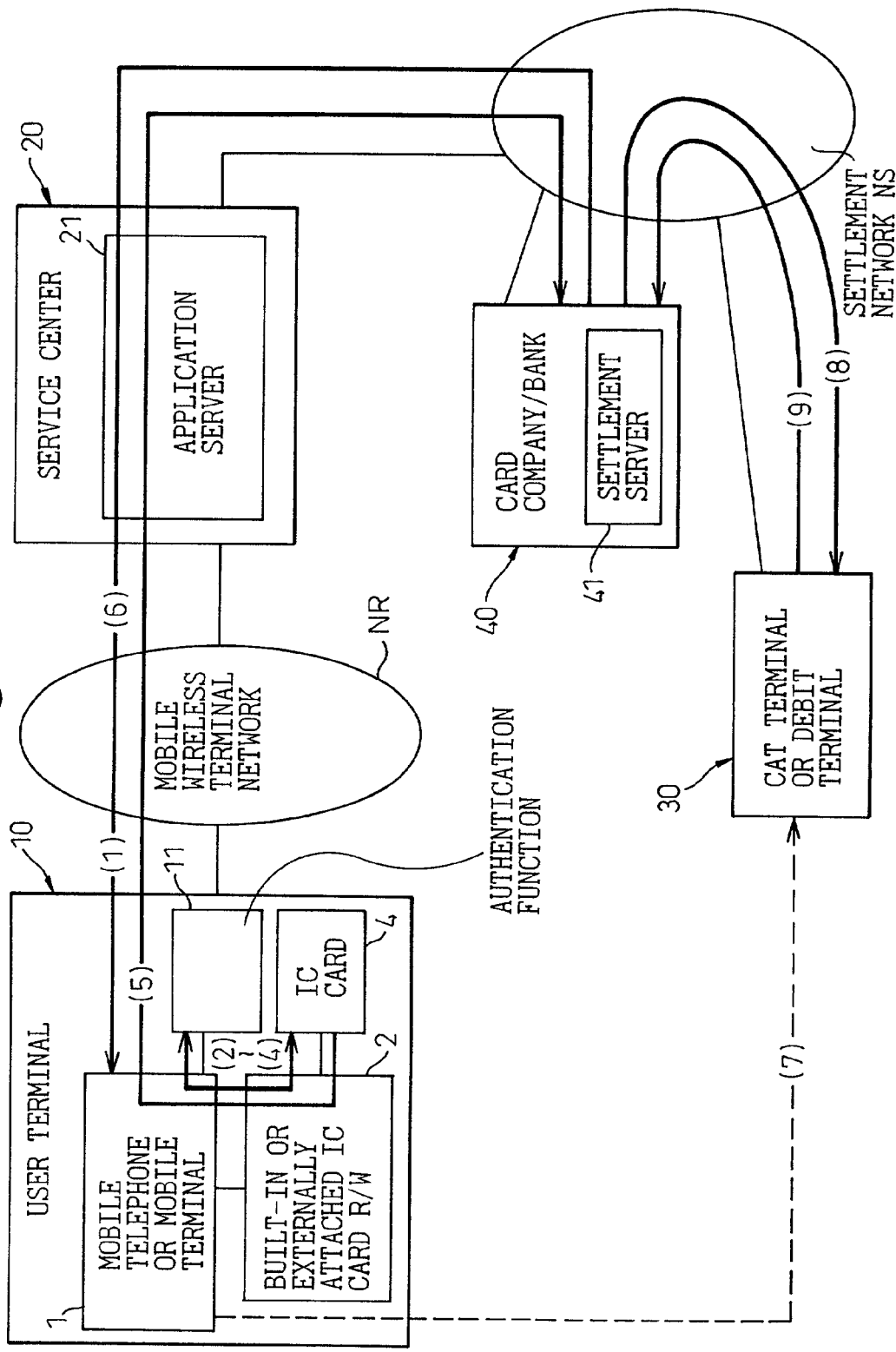

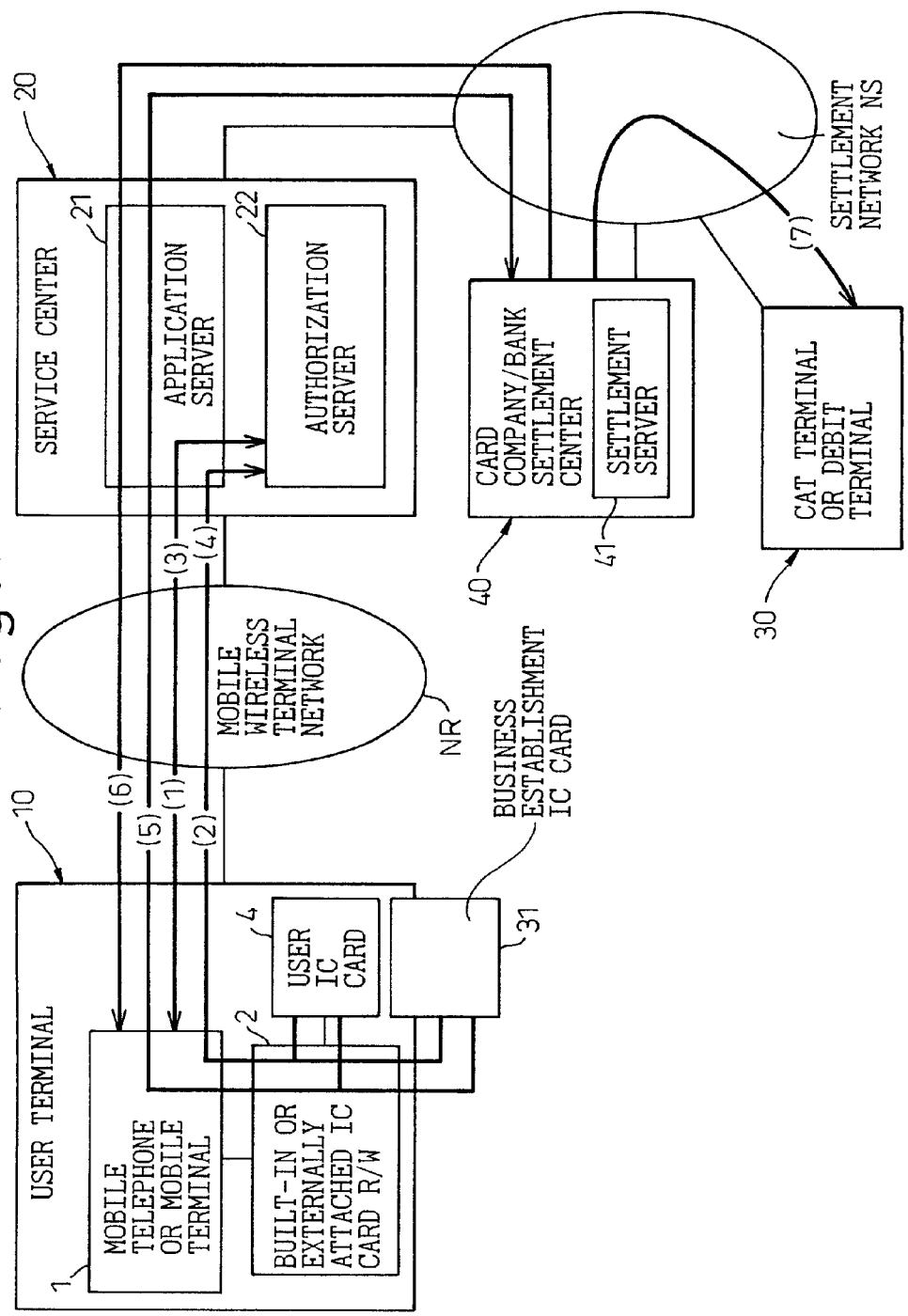

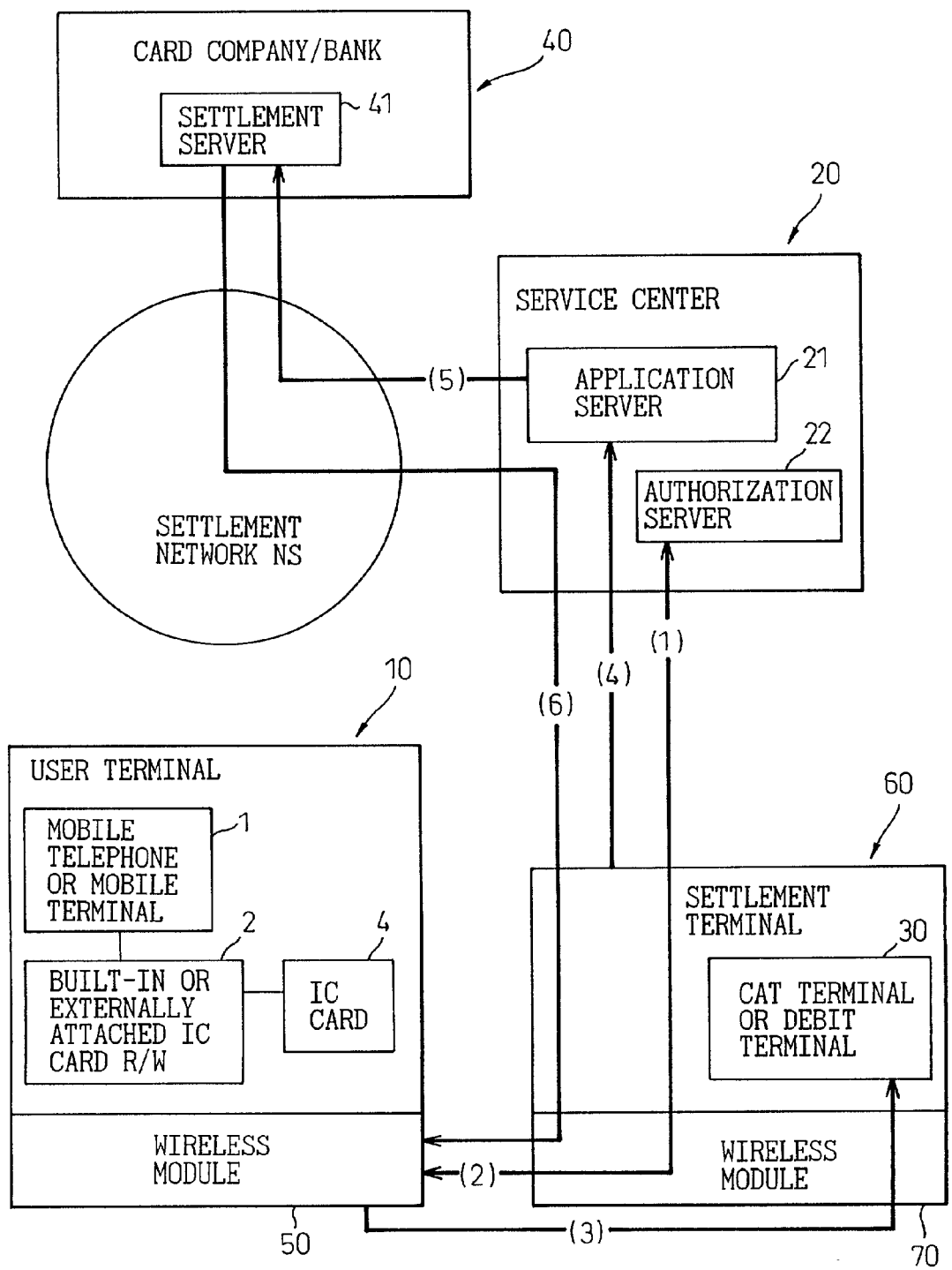

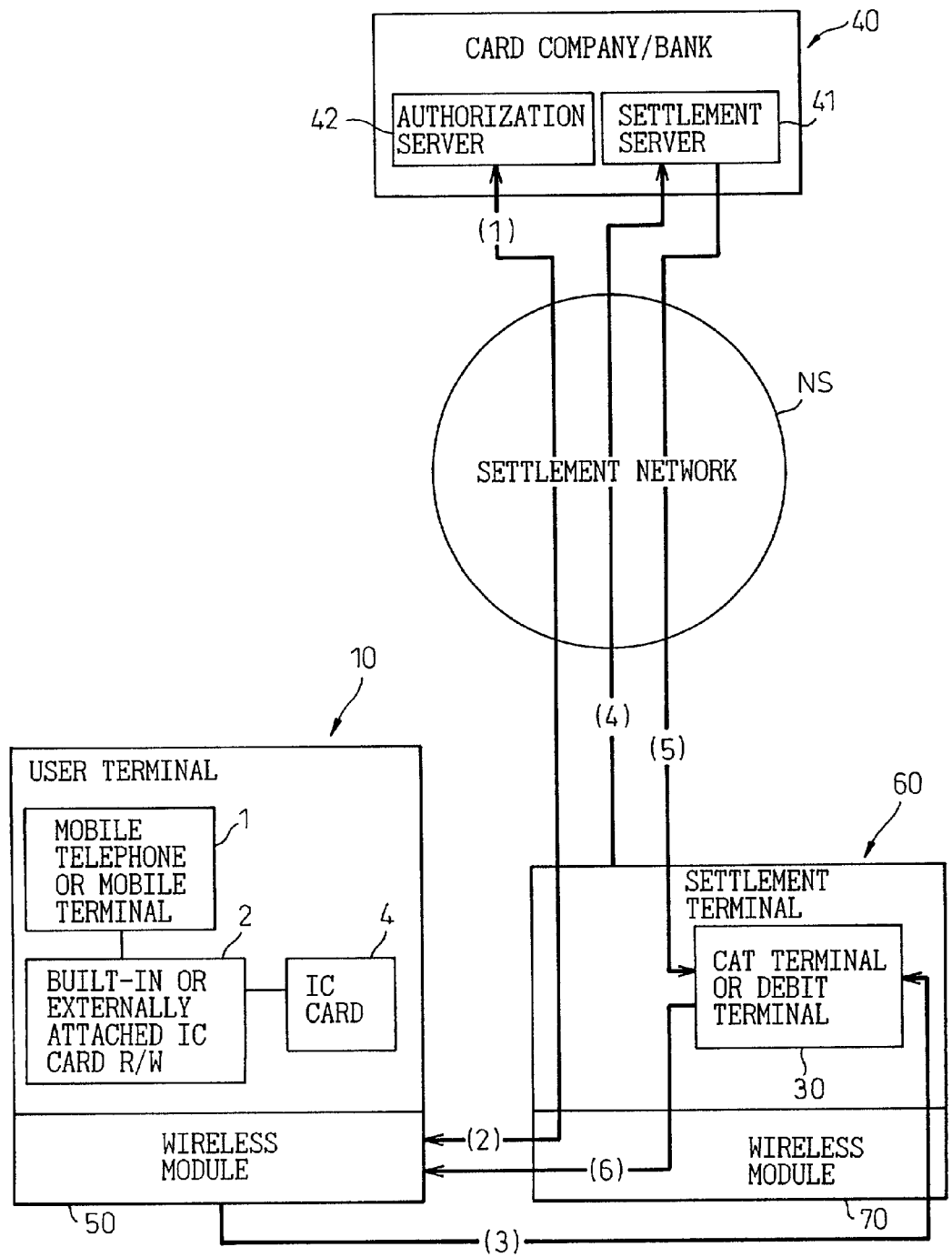

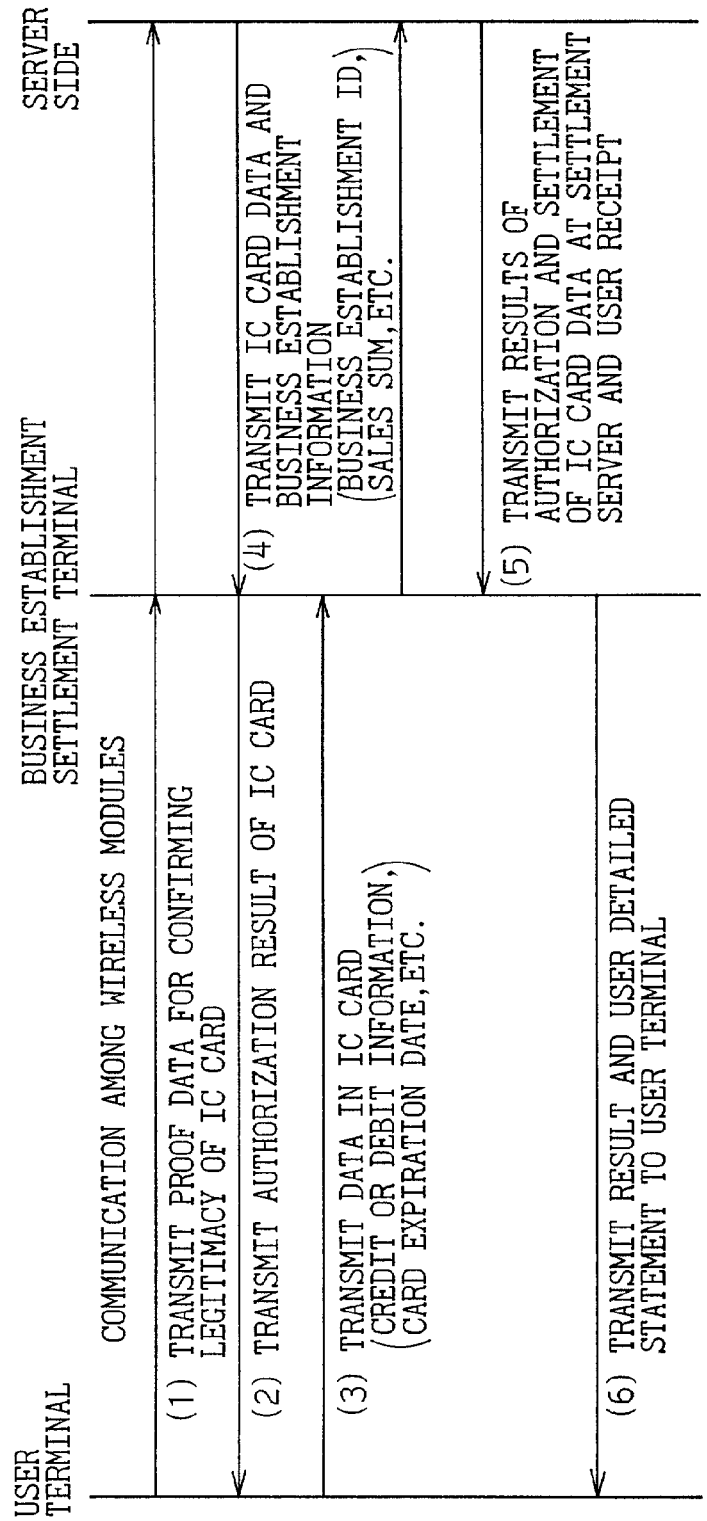

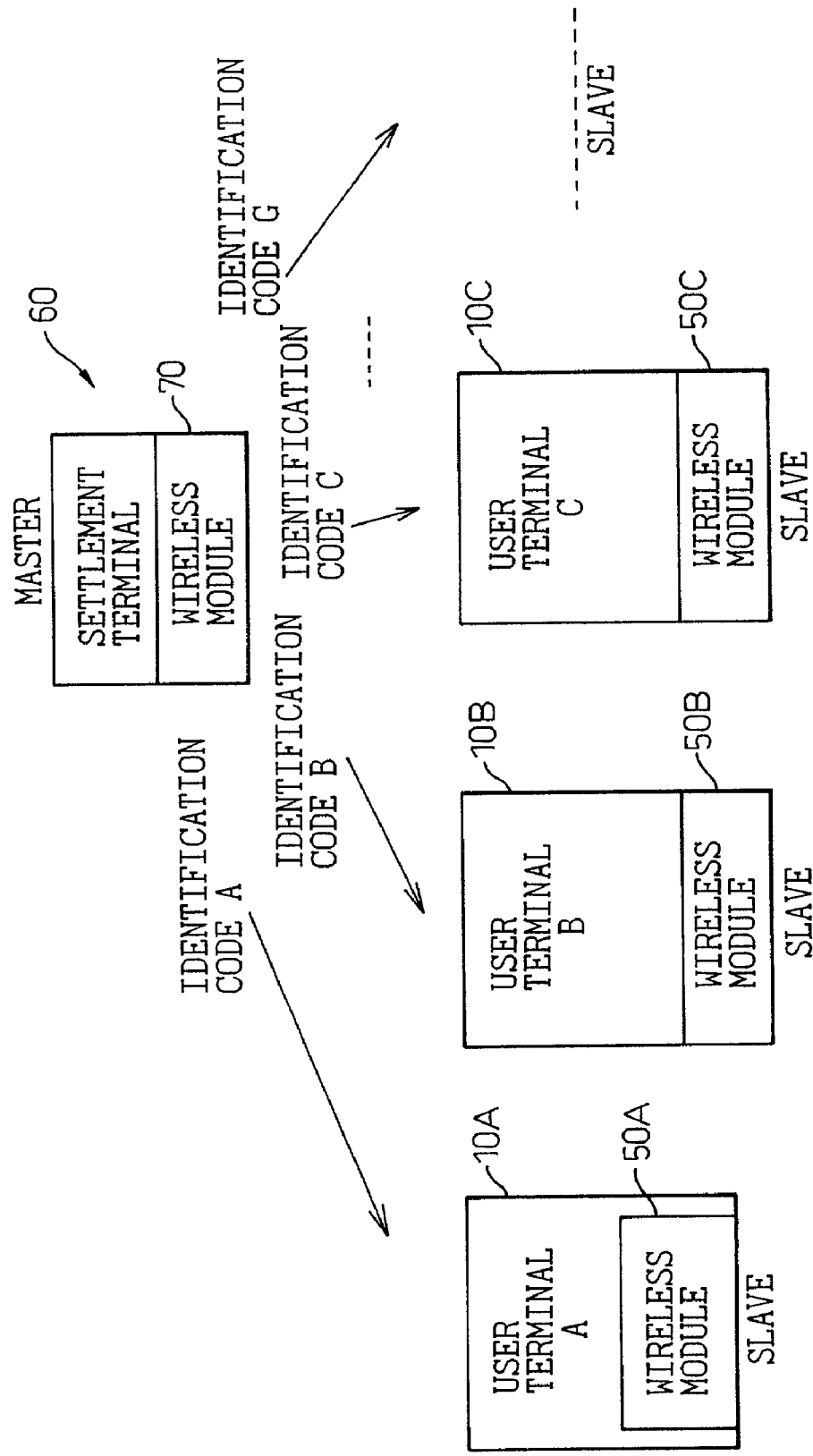

CARD SETTLEMENT METHOD AND SYSTEM USING MOBILE INFORMATION TERMINAL

BACKGROUND OF THE INVENTION

1. Field of the Invention

The present invention relates to a card settlement method and system using a mobile information terminal, more particularly relates to a card settlement method and system capable of wirelessly settling a purchase price or a usage price by using a mobile information terminal capable of a read/write operation with respect to an integrated circuit (IC) card.

2. Description of the Related Art

In the past, the most popular methods of cashless settlement of a charge incurred when a customer uses a business establishment (purchase price, dining charge, service usage charge, etc.) have been credit cards and debit cards. Credit cards are used for credit sales offered through the cooperation of business establishments, credit card companies, and banks and are issued to persons judged to have sufficient ability to pay by check or sufficient bank balances. When settling a charge by using a credit card, a magnetic strip of the credit card is swiped through a settlement terminal provided in the business establishment, that is, a computer assisted transaction (CAT) terminal, and the settlement information is sent to the credit card company.

A credit card is not directly linked with the customer's bank account, so the CAT terminal inquires at the authorization center of the credit card if the usage of the card of the user can be authorized (sends magnetic information). The authorization center decides from the information whether or not to authorize the use. The authorization center confirms the content of the magnetic information read from the credit card and checks if the card number is on a customer blacklist or if the limit of the card usage has been exceeded so as to prevent misuse. If this check reveals there is no problem in the credit card, the authorization center returns an authorization to the CAT terminal. Twenty to 50 days after usage of the credit card, an account statement is sent to the customer. The customer then either writes a check for all or part of the billed amount or the sum is automatically withdrawn from his or her bank account.

In this way, in settlement by a credit card, credit-worthy customers are allowed to pay for all or part of charges by check or through automatic deduction from his or her bank account 20 to 50 days from the date of usage at the business establishments. In recent years, a card system has also been developed for persons having low or no credit. In this "debit card" system, the charge is settled immediately or within two or three days. The debit card is linked with the host computer of the customer's bank through the network of a credit card company. Since the debit card is directly linked with the customer's bank account, the charge is deducted from the actually available funds in the account at the spot where the charge was incurred.

Such credit cards and debit cards, however, generally use magnetic strips to business establishment the information required for the settlement, so there was no means for dealing with card misuse resulting from illicit acquisition of the magnetic data by third parties or tampering with the data on the magnetic strips.

To solve this problem, tamper-proof IC cards having a far greater storage capacity than magnetic strip cards and preventing the information in the card from being viewed have started to appear. An IC card is a plastic card in which a IC chip is embedded and is referred to as a "smart card" in the West. An IC card basically includes a built-in central processing unit (CPU), read only memory (ROM), electrically erasable programmable read only memory (EEPROM), etc. Input/output of information to/from the memory is managed by the CPU. The IC card is protected by a personal identification number (PIN) known only to the user, so misuse by third parties is prevented. Further, there is also an IC card further improved in security by using bioinformation such as fingerprints, voiceprints, and retina prints as the authorizing means in place of a PIN.

However, the spread of such IC cards require installation of terminals equipped with IC card reading functions in a large number of business establishments. This is tremendously expensive. The installation cost of IC card readers has therefore been a factor obstructing the spread of IC cards.

SUMMARY OF THE INVENTION

An object of the present invention is to provide a card settlement method and system using a mobile information terminal enabling settlement by an IC card without requiring any change in CAT terminals at the business establishments.

The card settlement method using a mobile information terminal for achieving the above object is embodied in the following first to third aspects of the invention.

According to a first aspect of the present invention, there is provided a card settlement method using a mobile information terminal provided with an IC card read/write function and a wireless communication function for the settlement of a transaction in a business establishment, comprising a step of having a customer using a business establishment wirelessly connect to an authorization server through a network by the mobile information terminal, a step of having the customer load his or her IC card in the mobile information terminal, read the information stored in this IC card, and send it to the authorization server, a step of having the authorization server decide on the authorization of the current transaction from authentication information stored in the IC card and proving the legitimacy of the card, settlement information containing at least a card number, and personal identification information input from the customer and proving the legitimacy of the customer, a step of sending a temporary password issued from a settlement server to the mobile information terminal for display after the authorization of the current transaction, a step of inputting the temporary password and the current transaction information from a business establishment side settlement terminal and sending it to the settlement server, and a step of having the settlement server settle the transaction with the password and the transaction information satisfying the settlement conditions.

According to a second aspect of the present invention, there is provided a card settlement method using a mobile information terminal provided with an IC card read/write function and a wireless communication function for the settlement of a transaction in a business establishment, comprising a step of having a customer using a business establishment wirelessly connect with an authorization server through a network by the mobile information terminal, a step of having the customer load his or her IC card and a business establishment IC card provided in the business establishment in the mobile information terminal, read the information stored in these IC cards, and send it to the authorization server, a step of having the authorization server decide on legitimacy of these IC cards from authentication information stored in the IC card of the customer and proving legitimacy of the customer and business establishment information stored in the business establishment IC card and specifying the business establishment, a step of having the authorization server authenticate the customer from personal identification information input from the customer and proving the legitimacy of the customer after these IC cards are authenticated, a step of having the settlement server decide on authorization of the current transaction by settlement information stored in the IC card of the customer and containing at least a card number and current transaction information input by the customer after the customer is authenticated, and a step of having the settlement server settle the transaction where it is decided that the current transaction satisfies the settlement conditions.

According to a third aspect of the present invention, there is provided a card settlement method using a mobile information terminal provided with an IC card read/write function and a short distance wireless communication function and a settlement terminal on a business establishment side provided with a short distance wireless communication function, comprising a step of having a customer using a business establishment wirelessly connect the mobile information terminal with a settlement terminal on the business establishment side, a step of having the customer load his or her IC card in the mobile information terminal and send the information stored in this IC card and personal identification information input from the customer and proving legitimacy of the customer to the settlement terminal, a step of sending the authentication information and personal identification information stored in the IC card and proving the legitimacy of the card to an authorization server from the settlement terminal through a settlement network, a step of having the authorization server decide on a legitimacy of the IC card and a legitimacy of the customer based on the authentication information and the personal identification information, a step of having the customer wirelessly inputting information containing at least a card number stored in the IC card and transaction information input by the customer to the settlement terminal on the business establishment side after the IC card and the customer are authenticated, a step of having the settlement terminal decide a validity of the current transaction, a step of sending the current transaction information together with business establishment information for specifying the business establishment from the settlement terminal through the settlement network to the settlement server after the confirmation of the validity, and a step of having the settlement server carry out the settlement.

In the above methods of the present invention, it is possible to have the credit inquiry use terminal on the business establishment side issue a receipt after the settlement server settles the transaction.

Also, the card settlement system using a mobile information terminal for achieving the above object is embodied in the following fourth to sixth aspects of the invention.

According to a fourth aspect of the present invention, there is provided a card settlement system wherein a settlement terminal installed in a business establishment is connected through a settlement network with an authorization server and a settlement server retained by a card company or a bank and wherein a customer can settle a transaction by using a card, provided with a read/write function of an IC card for reading/writing information with respect to an IC card storing authentication information proving legitimacy of the card, personal identification information proving the legitimacy of the customer, and settlement information containing at least a card number stored therein, an application server storing an application software for a specific service, controlling a screen of the mobile information terminal, and providing a gateway function between the network of the mobile information terminal and the settlement network, and a password issuance function provided in the settlement server for issuing a temporary password based on settlement information input from the IC card through the network of the mobile information terminal, application server, and settlement network.

According to a fifth aspect of the present invention, there is provided a card settlement system wherein a settlement terminal installed in a business establishment is connected through a settlement network with an authorization server and a settlement server retained by a card company or a bank and wherein a customer can settle a transaction by using a card, provided with a read/write function of an IC card provided in a mobile information terminal and reading/writing information with respect to a personal IC card storing settlement information containing at least a card number, an expiration date of the card, and a customer name and a business establishment IC card storing business establishment information containing at least a transaction member business establishment ID and an application server storing application software for a specific service, controlling a screen of the mobile information terminal, and providing a gateway function between the network of the mobile information terminal and the settlement network.

According to a sixth aspect of the present invention, there is provided a card settlement system wherein a settlement terminal installed in a business establishment is connected through a settlement network with an authorization server and a settlement server retained by a card company or a bank and wherein a customer can settle a transaction by using a card, provided with a wireless module provided in a mobile information terminal owned by a customer, a read/write function of an IC card provided in the mobile information terminal and reading and writing information with respect to an IC card storing settlement information containing at least a card number, an expiration date of the card, and a customer name, and a wireless module provided in a settlement terminal capable of communicating with the wireless module of the mobile information terminal.

In the first and fourth aspects of the present invention, by having the mobile information terminal of the customer process the settlement by the IC card, sending the result of the processing, that is, the settlement approval result, and a temporary password to the settlement terminal of the business establishment, and having the settlement terminal of the business establishment re-input the temporary password therefrom, settlement by the IC card can be realized without adding any IC card read/write function to the settlement terminal of the business establishment. As a result, the customer can obtain security of the settlement by the IC card and convenience since the settlement becomes possible by the mobile information terminal in his own hand.

In the second and fifth aspects of the present invention, by having the mobile information terminal of the customer process the settlement by the IC card and having the mobile information terminal of the customer also transmit the business establishment information to the settlement server, settlement by the IC card can be realized even where there is no settlement terminal at the business establishment side. As a result, the customer can obtain security of the settlement by the IC card, convenience since the settlement becomes possible by the mobile information terminal in his or her own hand, and convenience of the settlement by the IC card even in a case where there is no settlement terminal on the business establishment side.

In the third and sixth aspects of the present invention, since the information required for the settlement is input from the mobile information terminal of the customer, leak of information is effectively countered. Also, since an IC card is used for the card settlement information of the customer, there is the benefit of the security of the IC card and illicit transactions can be prevented. Further, since the settlement terminal of the business establishment can perform parallel processing by simultaneously connecting the mobile information terminals of a plurality of customers, a reduction of the number of settlement terminals in the business establishment and shortening of a settlement wait time of the customer can be achieved and therefore a reduction of equipment and a higher efficiency of the processing can be achieved.

BRIEF DESCRIPTION OF THE DRAWINGS

The present invention will be more clearly understood from the description as set forth below with reference to the accompanying drawings, wherein:

FIGS. 1A and 1B show embodiments of a mobile information terminal used in first and second aspects of the present invention, in which FIG. 1A is a view of a state where an IC card read/write device is attached to a mobile telephone type mobile information terminal, and FIG. 1B is a view of a state where the IC card read/write device is attached to a PDA type mobile information terminal;

FIGS. 2A to 2C show embodiments of installation of a contact type IC card in a mobile telephone serving as a mobile information terminal used in the first and second aspects of the present invention, in which FIG. 2A is a view of a state where the IC card is inserted in an IC card insertion port provided in the mobile telephone, FIG. 2B is a view of a state where the IC card is inserted in the IC card insertion port provided in the mobile telephone and another IC card is built in the mobile telephone, and FIG. 2C is a view of an example of the mobile telephone with the IC card built therein;

FIGS. 3A and 3B show embodiments of installation of a noncontact type IC card in the mobile telephone as a mobile information terminal used in the first and second aspects of the present invention, in which FIG. 3A is a view of a state where the noncontact type IC card is inserted in the IC card insertion port provided in the mobile telephone, and FIG. 3B is a view of a state where the noncontact type IC card is inserted in the IC card insertion port provided in the mobile telephone and a contact type IC card is built in the mobile telephone;

FIG. 4 is a view of the system configuration of a first embodiment in the first aspect of the card settlement system using a mobile information terminal of the present invention;

FIG. 5 is a view of the system configuration of a second embodiment in the first aspect of the card settlement system using a mobile information terminal of the present invention;

FIG. 6 is a view of the system configuration of a third embodiment in the first aspect of the card settlement system using a mobile information terminal of the present invention;

FIG. 7 is a view of the system configuration of a first embodiment in the second aspect of the card settlement system using a mobile information terminal of the present invention;

FIG. 13 is a view of the system configuration of a first embodiment in the third aspect of the card settlement system using a mobile information terminal of the present invention;

FIG. 14 is a view of the system configuration of a second embodiment in the third aspect of the card settlement system using a mobile information terminal of the present invention;

FIG. 15 is a sequence diagram of a settlement sequence among wireless modules of the system shown FIG. 14; and FIG. 16 is a view of the system configuration of an example of application of the third aspect of the card settlement system using a mobile information terminal of the present invention.

DESCRIPTION OF THE PREFERRED EMBODIMENTS

Figure 1A:
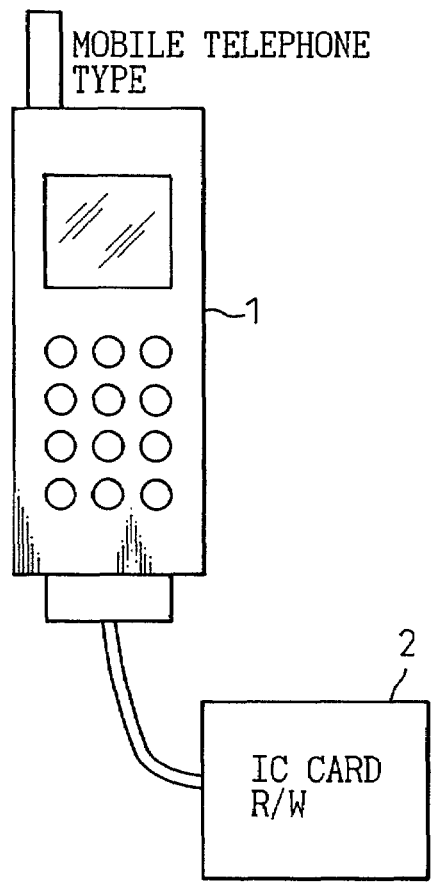
Figure 1B:
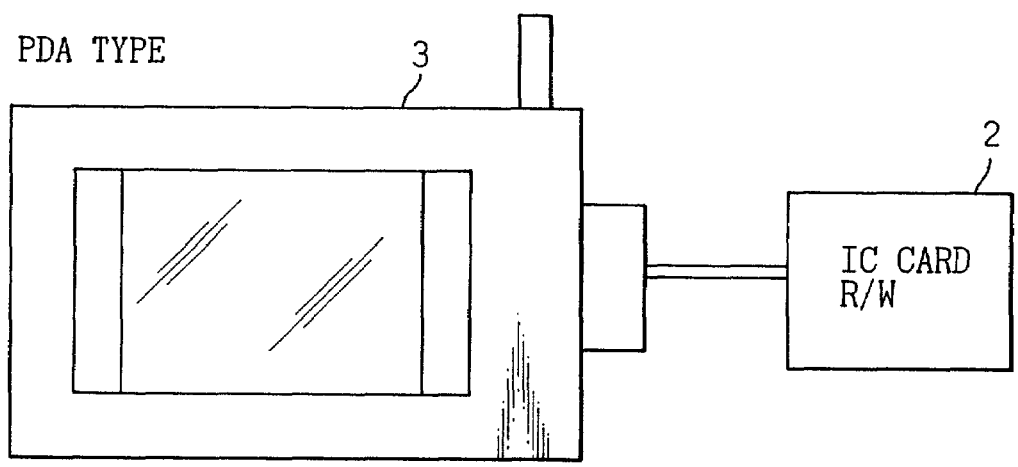

FIGS. 1A and 1B show embodiments of the mobile information terminal used in the first and second aspects of the present invention. In FIG. 1A, an IC card read/write device (described as "R/W" in FIGS. 1A and 1B) 2 is attached to a mobile telephone type mobile information terminal (like an Internet-ready mobile telephone, hereinafter simply described as a "mobile telephone" 1. Also, in FIG. 1B, the IC card read/write device 2 is attached to a PDA type mobile information terminal 3. In these embodiments, by just connecting the IC card read/write device 2 to an existing mobile telephone 1 or the PDA type mobile information terminal 3, it is possible to have them read the information in the IC card.

FIG. 2 shows an embodiment of assembly of a contact type IC card 4 into the mobile telephone 1 as a mobile information terminal used in the first and second aspects of the present invention. The contact type IC card 4 has the same size as a credit card, has a built-in IC 8 storing the data therein, and provided with a physical contact point. In the embodiment of FIG. 1A, the IC card 4 is inserted in an IC card insertion port 5 provided in the mobile telephone 1. Reference numeral 8 in the figure is the IC built in the IC card 4. In the embodiment of FIG. 1B, the IC card insertion port 5 is provided in the mobile telephone 1. At the same time, an IC card 6 with another IC 9 built therein is provided in the mobile telephone 1. Then, the IC card 4 is inserted in the IC card insertion port 5. In the embodiment of FIG. 1C, the IC card insertion port 5 is not provided in the mobile telephone 1. Only the IC card 6 with another IC 9 built therein is built in in advance. The IC card 6 built in the mobile telephone 1 in this way is referred to as an SIM card.

Figure 3A:
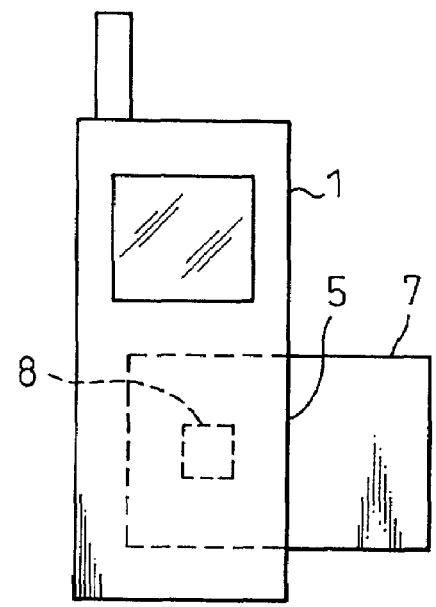
Figure 3B:
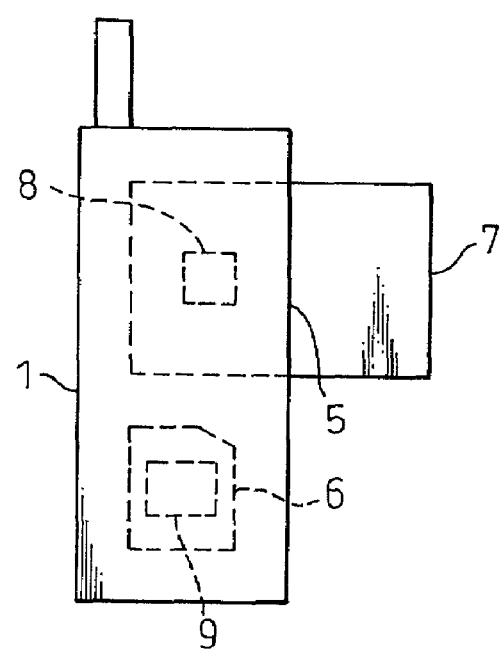

FIG. 3 shows an embodiment of assembly of a noncontact type IC card 7 into the mobile telephone 1 used in the first and second aspects of the present invention. The noncontact type IC card 7 also has the same size as the credit card and has an antenna built in the card itself. The IC chip 8 is also built in. There is also an antenna on the mobile telephone 1 side reading the data. The chip is activated by electricity by an electromagnetic induction method or an electrostatic coupling method. In FIG. 3A, the noncontact type IC card 7 is inserted in the IC card insertion port 5 provided in the mobile telephone 1. Also, in FIG. 3B, the noncontact type IC card 7 is inserted in the IC card insertion port 5 provided in the mobile telephone 1. At the same time, the contact type IC card 6 provided with an IC 9 is built in the mobile telephone 1.

In this way, in the card settlement system using a mobile information terminal of the present invention, a transaction is settled by reading the data in the IC card having the mobile information terminal or writing the data in the IC card. The IC card includes the above three types of forms. Accordingly, here, a detailed explanation will be given of three embodiments of the card settlement system of the present invention using this IC card and the mobile information terminal based on a plurality of embodiments.

First Aspect

FIG. 4 is a view of the system configuration of a first embodiment in a first aspect of the card settlement system using a mobile information terminal of the present invention.

In FIG. 4, 30 is a CAT terminal or a debit terminal as a credit inquiry terminal installed in a business establishment and connected through a settlement network NS with the card company or bank (hereinafter, described as a card company/bank) 40. Conventionally, when a purchase or other transaction is carried out in a business establishment by using a usual credit card or debit card, the card of the customer is read by this CAT terminal or debit terminal 30. When authorization is obtained by a not illustrated authorization server of the card company/bank 40 through the settlement network NS, the transaction is settled by a settlement server 41.

Also, in recent years, mobile information terminals like mobile telephones or mobile terminals 1 (hereinafter an explanation will be given taking as an example only the mobile telephone 1) have become able to communicate through a mobile wireless terminal network NR like a packet communication network and have become able to connect with the Internet.

In such an already existing system, in the first embodiment of the first aspect of the present invention, a built-in or externally attached IC card read/write device (hereinafter described as an IC card R/W) is connected with the mobile telephone 1. The information is read or written by the mobile telephone 1 with respect to the IC card 4 storing the information of the customer. Here, the mobile telephone 1, the built-in or externally attached IC card R/W 2, and the IC card 4 will be referred to together as a user terminal 10.

Next, in this embodiment, there is newly provided a service center 20 provided with an application server 21 located between the mobile wireless terminal network NR and the settlement network NS, storaging application software for a specific service, controlling the screen of the mobile telephone 1, and providing a gateway function between the network NR of the mobile telephone 1 and the settlement network NS. This service center 20 is provided with an authorization server 22 for authentication of the IC card 4 and authentication of the customer using this IC card 4 from the information of the customer IC card 4 sent from the mobile telephone 1 through the mobile wireless terminal network NR. The authorization server 22 is provided with a function for checking the validity of the card seen from the settlement application such as the expiration date of the card and presence on a blacklist.

Further, in the first aspect of the present invention, the settlement server 41 of the card company/bank 40 is provided with a one-time password issuance function for issuing a one-time password as a password capable of being used only one time based on the settlement information input from the IC card 4 through the network NS of the mobile information terminal, the application server 21, and the settlement network NS. The card number, personal identification number of the card, expiration date of the one-time password, the limit of amount of use by the one-time password, etc. are managed by the one-time password. As a method of management of the one-time password, there can be considered (a) a method wherein the password itself is data obtained by encrypting the above settlement information, the password itself is not stored at the settlement server, and data is combined and the propriety of the settlement is checked whenever a password is presented from the CAT terminal and (b) a method wherein the password itself is simply a serial number in nature, the settlement information accompanying the password is all stored at the server side, and the information stored at the server is called up when a password is presented from the CAT terminal for the settlement processing.

Next, a step-by-step explanation will be given of the method of settlement in a case where a user carrying a mobile telephone 1 provided with the IC card R/W 2 capable of reading its IC card 4 performs a transaction of purchasing a commodity or a transaction of receiving a predetermined service in a business establishment provided with a CAT terminal or debit terminal 30 in the card settlement system by using a mobile information terminal comprised as described above. Note that the step numbers shown below coincide with the numbers attached to routes indicated by the bold lines or a broken line in FIG. 4.

(1) When a customer wants to perform a predetermined transaction in a business establishment, the customer calls the service center 20 by the mobile telephone 1. The user terminal 10 and the authorization server 22 of the service center 20 are connected, and "READ IN IC CARD" is displayed in a display window of the mobile telephone 1.

(2) In response to this instruction, the customer reads the IC card 4 in the mobile telephone 1. In FIG. 4, the IC card 4 is separate from the mobile telephone 1, but there are a variety of forms of the IC card at this time as explained in FIG. 1 to FIG. 3. The information of the IC card 4 is input to the authorization server 22 of the service center 20. The authorization server 22 of the service center 20 authenticates the IC card 4 and checks the expiration date of the card and for presence on a blacklist based on the authentication information stored in the customer's IC card 4.

(3) After the authentication of the card, the authorization server 22 requests the input of the personal identification number of the IC card 4 from the mobile telephone 1 of the customer to verify the identity of the customer.

(4) The customer inputs the personal identification number by using the keys of the mobile telephone 1. By this personal identification number, the authorization server 22 verifies the identity of the customer.

Note that, as the method of authentication at this time, other than the personal identification number, if a fingerprint, voiceprint, retina print, or other bio authentication information is read and compared by using these reading devices, further security can be achieved.

Also, further security can be achieved by registering specific information concerning a subject known only to the user in the IC card in advance in place of the authorization of the user by the personal identification number, having the user input this specific information at the time of authentication of the user, and comparing it with the specific information in the IC card.

(5) After the authentication of the customer, the IC card credit (or IC debit) information stored in the IC card 4 is transmitted via the application server 21 to the settlement server 41 of the card company/bank 40.

(6) The settlement server 41 of the card company/bank 40 generates the one-time password (alphanumerics) useable for only one transaction in a certain constant time (for example, 30 minutes) from the time of generation based on the personal identification number and IC credit (or IC debit) information of the received IC card 4 and the receiving time and displays the same via the application server 21 on the mobile telephone 1 of the user terminal 10.

(7) The customer inputs the one-time password displayed on the mobile telephone 1 from the CAT terminal or the debit terminal 30 of the business establishment. This input may be carried out by a staff of the business establishment or may be directly carried out by the customer.

(8) The CAT terminal or the debit terminal 30 transfers the information added with the one-time password input to the transaction information of the customer through the settlement network NS to the settlement server 41 of the card company/bank 40.

(9) After checking the transaction information and the password, the settlement server 41 transfers the data to the CAT terminal or the debit terminal 30 of the business establishment for a transaction satisfying the settlement conditions and issues a receipt. The transaction of the customer is completed by this.

After an elapse of a predetermined period from the completion of this transaction, in the same way as a usual credit transaction, the customer receives a bill from the card company.

FIG. 5 is a view of the system configuration of a second embodiment in the first aspect of the card settlement system using a mobile information terminal of the present invention. The difference of the second embodiment from the first embodiment resides in the location of the authorization server for authenticating the customer IC card 4. Namely, the difference resides in that while the authorization server 22 for authenticating the customer IC card 4 was provided in the service center 20 in the first embodiment, the authorization server 42 is provided not in the service center 20, but in the card company/bank 40 in the second embodiment.

Accordingly, in the second embodiment, the settlement method when the customer carrying a mobile telephone 1 provided with an IC card R/W 2 capable of reading his IC card 4 performs a transaction of purchasing a commodity or a transaction of receiving a predetermined service in a business establishment provided with a CAT terminal or debit terminal 30 is different from the first embodiment mentioned above only in the portion of authentication. Accordingly, in the second embodiment, the explanation will be given of the settlement method only for the portion different from the first embodiment. Note that, the route numbers indicated by the bold lines and the broken line in FIG. 5 indicate the step numbers similar to the first embodiment.

(1) When the customer wants to perform a predetermined transaction inae business establishment, the customer calls the service center 20 by the mobile telephone 1. The user terminal 10 and the authorization server 22 of the service center 20 are connected, and "READ IN IC CARD" is displayed in a display window of the mobile telephone 1.

(2) In response to this instruction, the customer reads his IC card 4 in the mobile telephone 4. In FIG. 5 as well, the IC card 4 is separate from the mobile telephone 1, but there are a variety of forms of the IC card at this time as explained in FIG. 1 to FIG. 3. The information of the IC card 4 is input to an authorization server 42 in the card company/bank 40 via the application server 21 of the service center 20. The authorization server 42 authenticates the IC card 4 and, at the same time, checks the expiration date of the card and for presence on a blacklist based on the authentication information stored in the customer's IC card 4.

(3) After the authentication of the card, the authorization server 42 requests the input of the personal identification number from the customer's mobile telephone 1 to verify the identity of the customer.

(4) The customer inputs the personal identification number by using the keys of the mobile telephone 1. The authorization server 42 verifies the identity of the customer by this personal identification number.

Steps of (5) to (9) are similar to those of the first embodiment.

FIG. 6 is a view of the system configuration of a third embodiment in the first aspect of the card settlement system using a mobile information terminal of the present invention. The difference of the third embodiment from the first embodiment resides in the location of the authorization server for authenticating the customer's IC card 4. Namely, the difference resides in the point that while the authorization server 22 for authenticating the customer's IC card 4 was provided in the service center 20 in the first embodiment, the authentication function 11 is provided not in the service center 20, but in the user terminal 10 in the third embodiment.

Accordingly, in the third embodiment, the settlement method when a customer carrying a mobile telephone 1 provided with an IC card R/W 2 capable of reading his IC card 4 performs a transaction of purchasing a commodity or a transaction of receiving a predetermined service in a business establishment provided with a CAT terminal or debit terminal 30 is different from the first embodiment mentioned above only in the portion of authentication. Accordingly, in the third embodiment, an explanation will be given of the settlement method only for the portion different from the first embodiment. Note that, the route numbers indicated by the bold lines and the broken line in FIG. 6 indicate the step numbers similar to the first embodiment.

(1) When a customer desires to perform a predetermined transaction in a business establishment, the customer calls the service center 20 by the mobile telephone 1. The user terminal 10 and the service center 20 are connected, and "READ IN IC CARD" is displayed in a display window of the mobile telephone 1.

(2) In response to this instruction, the customer reads his IC card 4 in the mobile telephone 4. In FIG. 6 as well, the IC card 4 is separate from the mobile telephone 1, but there are a variety of forms of the IC card at this time as explained in FIG. 1 to FIG. 3. The information of the IC card 4 is input to the authentication function 11 in the mobile telephone 4. The authentication function 11 authenticates the IC card 4 and checks the expiration date of the card and for presence on a blacklist based on the authentication information stored in the customer IC card 4.

(3) After the authentication of the card, the authentication function 11 requests the input of the personal identification number from the customer's mobile telephone 1 to verify the identity of the customer.

(4) The customer inputs the personal identification number by using the keys of the mobile telephone 1. The authentication function 11 verifies the identity of the customer by this personal identification number.

Steps of (5) to (9) are similar to those of the first embodiment.

In this way, in the first aspect of the present invention, by sending the one-time password from the CAT terminal or debit terminal 30 originally designed to send the magnetic strip information, it is possible to check the legitimacy of the one-time password at the service center 20 side and verify that the transaction is legitimate, so a transaction is possible even when there is no device for verifying or receiving the customer's IC card at the business establishment. Namely, in the present aspect, by having the user terminal process the settlement by the IC card and input only the one-time password of the result of the processing from the CAT terminal or debit terminal 30, settlement by the IC card can be realized without adding any IC card read/write function to the CAT terminal or debit terminal 30. As a result, a customer can enjoy both security of the settlement by the IC card and convenience of settlement by the mobile information terminal.

Second Aspect

FIG. 7 is a view of the system configuration of a first embodiment in a second aspect of the card settlement system using a mobile information terminal of the present invention. Note that, symbols the same as those in the first embodiment are attached to the same facilities and components as the facilities and components explained in the first aspect.

In the second aspect as well, as shown in FIG. 7, the business establishment has to have the CAT terminal or the debit terminal 30 connected with the card company/bank 40 through the settlement network NW. Further, it is also necessary that the mobile telephone serving as the mobile information terminal communicate through a mobile wireless terminal network NR like a packet communication network and can also be connected with the Internet.

Further, in such an already existing system, in the second aspect of the present invention, an IC card 31 for a business establishment is necessary in addition to the IC card 4 and the IC card R/W 2 built in or externally attached to the mobile telephone 1 required in the first aspect. The mobile telephone 1 becomes able to read/write information with respect to the customer IC card 4 and becomes able to read also the authentication information in the business establishment IC card 31. Note that, in the second aspect as well, the mobile telephone 1, built-in or externally attached IC card R/W 2, and the IC card 4 will be referred to as the user terminal 10 together.

Next, in the first embodiment of the second aspect, there is newly provided the service center 20 provided with the application server 21 located between the mobile wireless terminal network NR and the settlement network NS, storing the application software for a specific service, controlling the screen of the mobile telephone 1, and providing a gateway function between the network NR of the mobile telephone 1 and the settlement network NS similar to the first embodiment of the first aspect. This service center 20 is provided with an authorization server 22 for authentication of the IC card 4 and the business establishment IC card 31, verification of the identity of the customer as the user of this IC card 4, and verification of the identity of the staff of the business establishment as the user of the business establishment IC card 31 from the information of the customer IC card 4 and the business establishment IC card 31 sent from the mobile telephone 1 through the mobile wireless terminal network NR. The authorization server 22 is provided with a function for checking the validity of the card as seen from the settlement application such as the expiration date of the card and presence on a blacklist.

On the other hand, in the second aspect of the present invention, the one-time password issuance function for issuing the one-time password is not provided in the settlement server 41 of the card company/bank 40.

A step-by-step explanation will be given next of the settlement method when a user carrying a mobile telephone 1 provided with an IC card R/W 2 capable of reading his IC card 4 and a business establishment IC card 31 performs a transaction of purchasing a commodity or a transaction of receiving a predetermined service in a business establishment provided with a CAT terminal or debit terminal 30 in a card settlement system by using a mobile information terminal comprised as described above. Note that the step numbers shown below coincide with numbers attached to routes indicated by bold lines or a broken line in FIG. 7.

(1) When a customer desires to perform a predetermined transaction in a business establishment, the customer calls the service center 20 by the mobile telephone 1. The user terminal 10 and the authorization server 22 of the service center 20 are connected, and "READ IN YOUR IC CARD AND BUSINESS ESTABLISHMENT CARD" is displayed in a display window of the mobile telephone 1.

(2) In response to this instruction, the customer reads his IC card 4 and the business establishment IC card borrowed from the business establishment in the mobile telephone 4. In FIG. 7 as well, the IC card 4 is separate from the mobile telephone 1, but there are a variety of forms of the IC card at this time as explained in FIG. 1 to FIG. 3. The information of the customer IC card 4 and the business establishment IC card 31 is input to the authorization server 22 of the service center 20. The authorization server 22 of the service center 20 authenticates the customer IC card 4 and the business establishment IC card 31 based on the authentication information stored in the customer IC card 4 and the business establishment IC card 31 and, at the same time, checks the expiration date of the card and for presence on a blacklist.

(3) After the authentication of the card, the authorization server 22 requests the input of the personal identification number of the IC card 4 and the personal identification number of the business establishment IC card 31 from the customer's mobile telephone 1 to verify the identity of the user and the staff of the business establishment.

(4) The customer and the staff of the business establishment input their personal identification numbers by using the keys of the mobile telephone 1. The authorization server 22 verifies the identity of the customer and the staff of the business establishment by these personal identification numbers.

> Note that, as the method of authentication at this time, other than the personal identification number, if a fingerprint, voiceprint, retina print, or other bio authentication information is read and compared by using these reading devices, further security can be achieved.

(5) After the authentication of the customer and the staff of the business establishment, in addition to the IC card (or IC debit) information stored in the IC card 4 and the business establishment information stored in the business establishment IC card, the charge at the business establishment is sent via the application server 21 to the settlement server 41 of the card company/bank 40.

(6) The settlement server 41 of the card company/bank 40 examines the validity of the related transaction based on the received personal identification number of the IC card 4, IC credit (or IC debit) information, the business establishment information of the business establishment IC card 31, and the transaction charge information and displays the result via the application server 21 on the mobile telephone 1 of the user terminal 10.

(7) The settlement server 41 simultaneously transfers the data to the CAT terminal or debit terminal 30 of the business establishment for a transaction satisfying the settlement conditions and issues a receipt. The transaction of the customer is completed by this. A receipt is issued from the CAT terminal or debit terminal 30 since the business establishment likes to have a copy of the transaction, but this can be omitted if not necessary.

After an elapse of a predetermined period from the completion of this transaction, in the same way as a usual credit transaction, the customer receives a bill from the card company.

Figure 8:
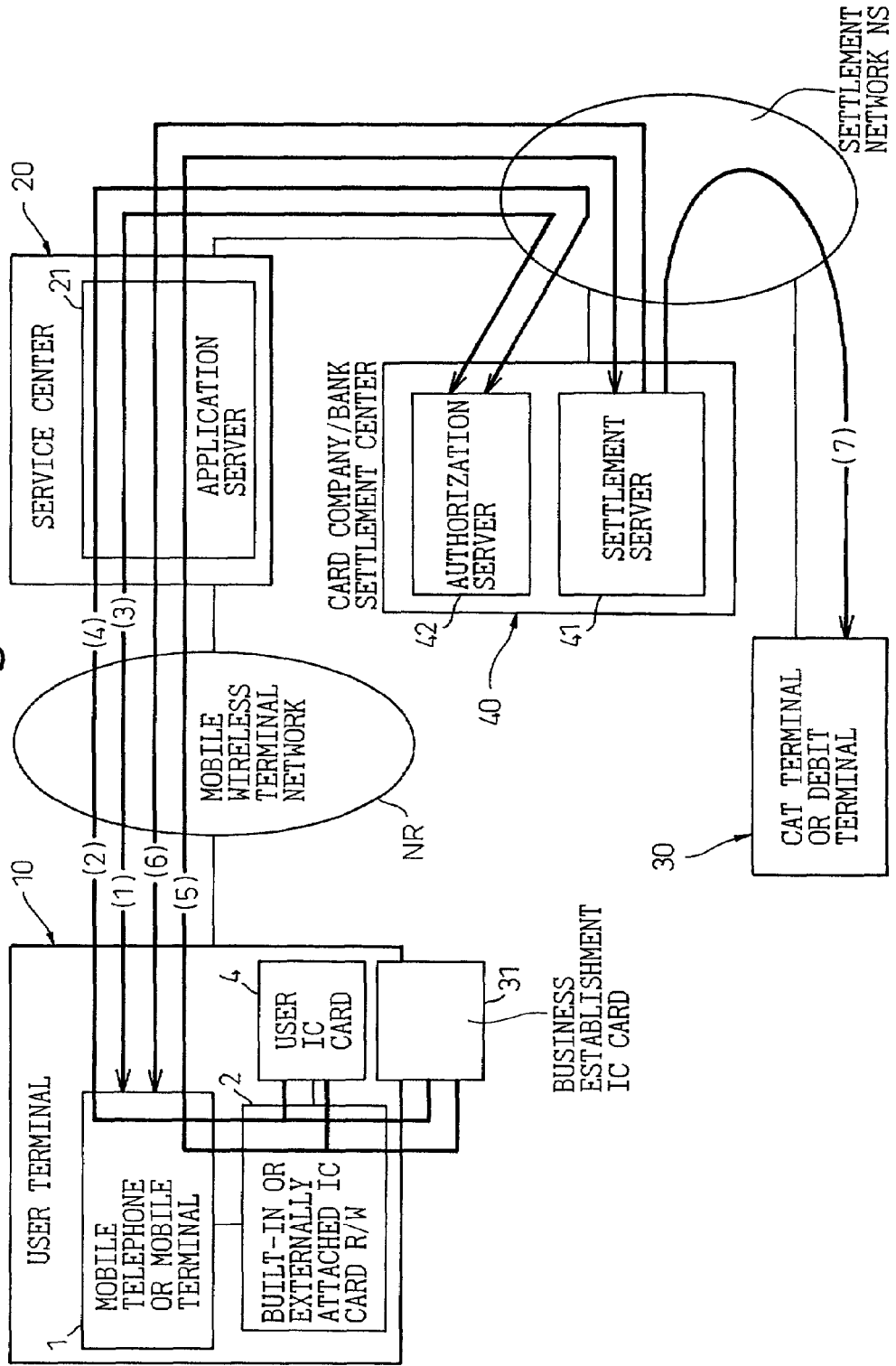
FIG. 8 is a view of the system configuration of a second embodiment in the second aspect of the card settlement system using a mobile information terminal of the present invention.

FIG. 8 is a view of the system configuration of a second embodiment in the second aspect of the card settlement system using a mobile information terminal of the present invention.

The difference of the second embodiment from the first embodiment resides in the location of the authorization server for authentication of the customer IC card 4 and the business establishment IC card 31. Namely, the difference resides in that while the authorization server 22 for authenticating the customer IC card 4 and the business establishment IC card 31 was provided in the service center 20 in the first embodiment, the authorization server 42 is provided not in the service center 20, but in the card company/bank 40 in the second embodiment.

Accordingly, in the second embodiment, the settlement method when a customer carrying a mobile telephone 1 provided with an IC card R/W 2 capable of reading his IC card 4 and a business establishment IC card 31 performs a transaction of purchasing a commodity or a transaction of receiving a predetermined service in a business establishment provided with a CAT terminal or debit terminal 30 is different from the first embodiment mentioned above only in the portion of authentication. Accordingly, in the second embodiment, an explanation will be given of the settlement method only for the portion different from the first embodiment. Note that, the route numbers indicated by the bold lines in FIG. 8 indicate the step numbers similar to the first embodiment.

(1) When a customer wants to perform a predetermined transaction in a business establishment, the customer calls the service center 20 by the mobile telephone 1. The user terminal 10 and the authorization server 22 of the service center 20 are connected, and "READ IN YOUR IC CARD AND BUSINESS ESTABLISHMENT CARD" is displayed in a display window of the mobile telephone 1.

(2) In response to this instruction, the customer reads his IC card 4 and the business establishment IC card 31 borrowed from the business establishment in the mobile telephone 4. In FIG. 8 as well, the IC card 4 is separate from the mobile telephone 1, but there are a variety of forms of the IC card at this time as explained in FIG. 1 to FIG. 3. The information of the IC card 4 and the business establishment IC card 31 is input via the application server 21 of the service center 20 to the authorization server 42 in the card company/bank 40. The authorization server 42 authenticates the IC card 4 based on the authentication information stored in the customer IC card 4 and the business establishment IC card 31 and, at the same time, checks the expiration date of the card and for presence on a blacklist.

(3) After the authentication of the card, the authorization server 42 requests the input of the personal identification numbers from the customer's mobile telephone 1 to verify the identity of the customer and the staff of the business establishment.

(4) The customer and the staff of the business establishment input their personal identification numbers by using the keys of the mobile telephone 1. The authorization server 42 verifies the identity of the customer and the staff of the business establishment by these personal identification numbers.

Steps (5) to (7) are similar to those of the first embodiment.

Figure 9:
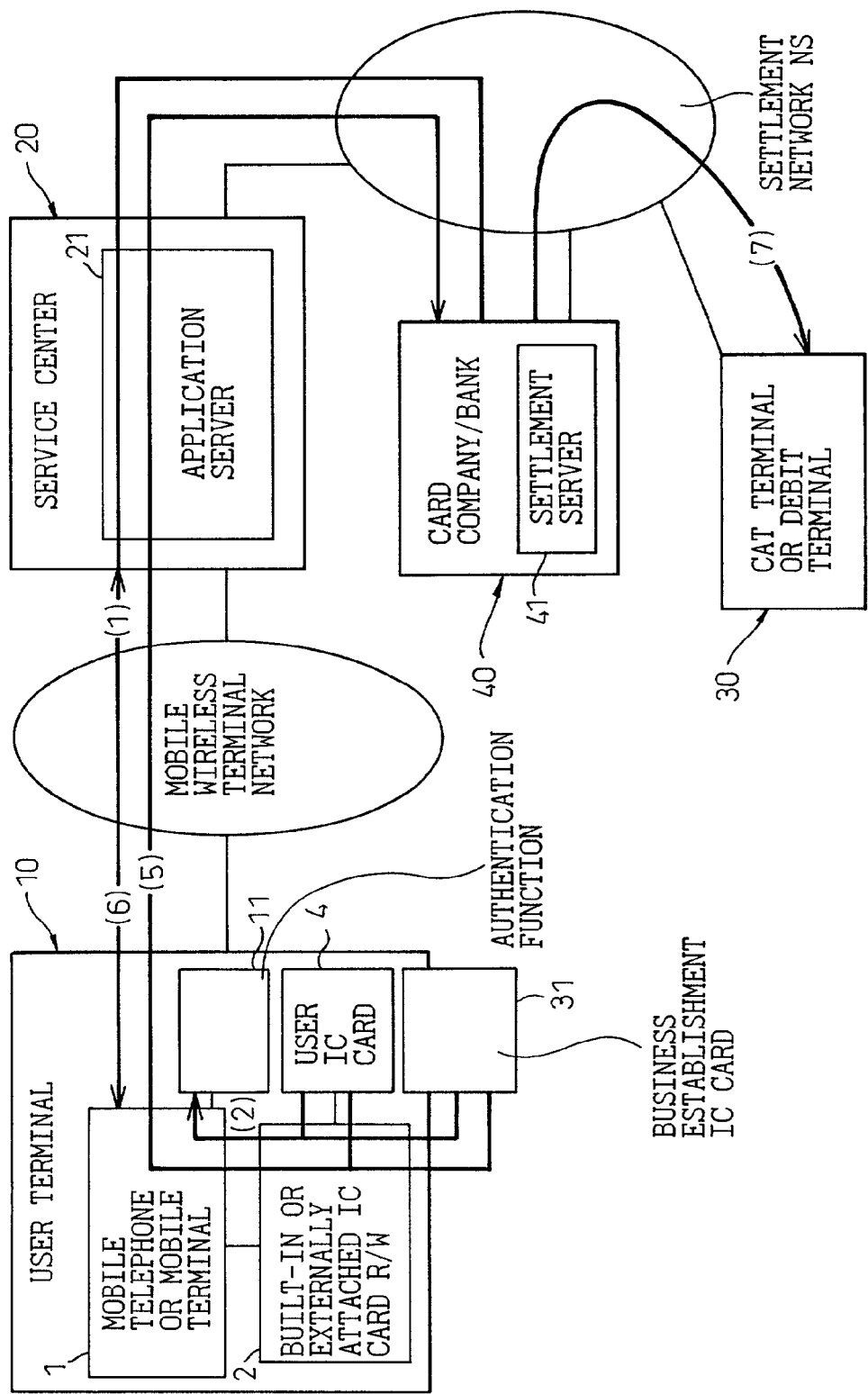
FIG. 9 is a view of the system configuration of a third embodiment in the second aspect of the card settlement system using a mobile information terminal of the present invention.

FIG. 9 is a view of the system configuration of a third embodiment in the second aspect of the card settlement system using a mobile information terminal of the present invention. The difference of the third embodiment from the first embodiment resides in the location of the authorization server for authenticating the customer IC card 4 and the business establishment IC card 31. Namely, the difference resides in that while the authorization server 22 for authenticating the customer IC card 4 and the business establishment IC card 31 was provided in the service center 20 in the first embodiment, the authentication function 11 is provided not in the service center 20, but in the user terminal 10 in the third embodiment.

Accordingly, in the third embodiment, the settlement method when the customer carrying a mobile telephone 1 provided with an IC card R/W 2 capable of reading his IC card 4 and a business establishment IC card 31 performs a transaction of purchasing a commodity or a transaction of receiving a predetermined service in a business establishment provided with a CAT terminal or debit terminal 30 is different from the first embodiment mentioned above only in the portion of authentication. Accordingly, in the third embodiment, an explanation will be given of the settlement method only for the portion different from the first embodiment. Note that, the route numbers indicated by the bold lines in FIG. 9 indicate the step numbers similar to the first embodiment.

(1) When a customer wants to perform a predetermined transaction in a business establishment, the customer calls the service center 20 by the mobile telephone 1. The user terminal 10 and the service center 20 are connected, and "READ IN YOUR IC CARD AND BUSINESS ESTABLISHMENT CARD" is displayed in a display window of the mobile telephone 1.

(2) In response to this instruction, the customer reads his IC card 4 and the business establishment IC card 31 in the mobile telephone 4. In FIG. 9 as well, the IC card 4 is separate from the mobile telephone 1, but there are a variety of forms of the IC card at this time as explained in FIG. 1 to FIG. 3. The information of the IC card 4 and the business establishment IC card 31 is input to the authentication function 11 in the mobile telephone 4. The authentication function 11 authenticates the IC card 4 and the business establishment IC card 31 based on the authentication information stored in the customer IC card 4 and, at the same time, checks the expiration date of the card and for presence on a blacklist.

(3) After the authentication of the card, the authorization function 11 requests the input of the personal identification numbers from the customer's mobile telephone 1 to verify the identity of the customer and the staff of the business establishment.

(4) The customer and the staff of the business establishment input their personal identification numbers by using the keys of the mobile telephone 1. The authentication function 11 verifies the identity of the customer and the staff of the business establishment by thee personal identification numbers.

Steps (5) to (7) are similar to those of the first embodiment.

In this way, in the second aspect of the present invention, by having the user terminal process the settlement by the IC card and then transmitting also the business establishment information from the user terminal to the settlement server together, settlement by the IC card can be realized without adding any IC card read/write function to the CAT terminal or debit terminal 30. Also, settlement by the IC card can be realized even when there is no CAT terminal or debit terminal 30 at the business establishment side. As a result, the customer can enjoy both the security of settlement by the IC card and the convenience of settlement by the mobile information terminal.

Third Aspect

Figure 10:
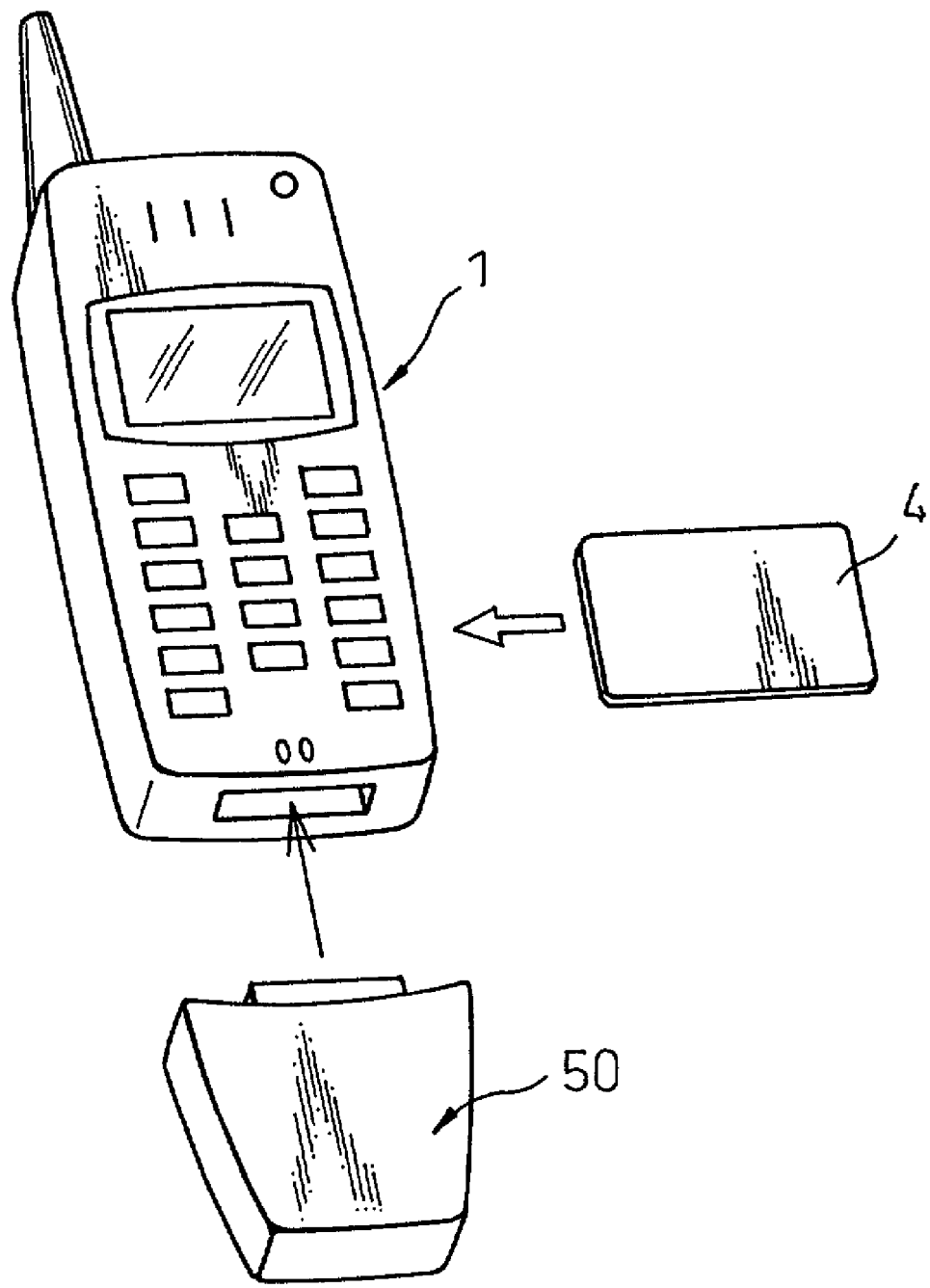
FIG. 10 is a perspective view of the configuration of a mobile telephone serving as a mobile information terminal capable of mounting an IC card and a short distance wireless communication module thereon used in a third aspect of the present invention.

FIG. 10 shows the configuration of the mobile telephone 1 as a mobile information terminal capable of mounting the IC card 4 and a short distance wireless communication module (hereinafter, simply referred to as a wireless module) 50 thereon used in the third embodiment of the present invention. As the wireless module 50, use can be made of one according to the "Bluetooth" industry standard of short distance wireless communication.

Bluetooth is a communication method using radio waves of the 2.4 GHz band, sending a signal containing data by dividing it to 79 frequencies, and recombining them at the receiver side. The used frequency is changed 1600 times per second, therefore there is an advantage that the influence of other electric waves and noise can be suppressed. Progress is made in commercial application of this. In Bluetooth, if a dedicated communication chip and an ultra-small sized antenna are installed, apparatuses can confirm each other by issuing short signals, so up to a maximum of seven apparatuses can be connected wirelessly.

Figure 11:
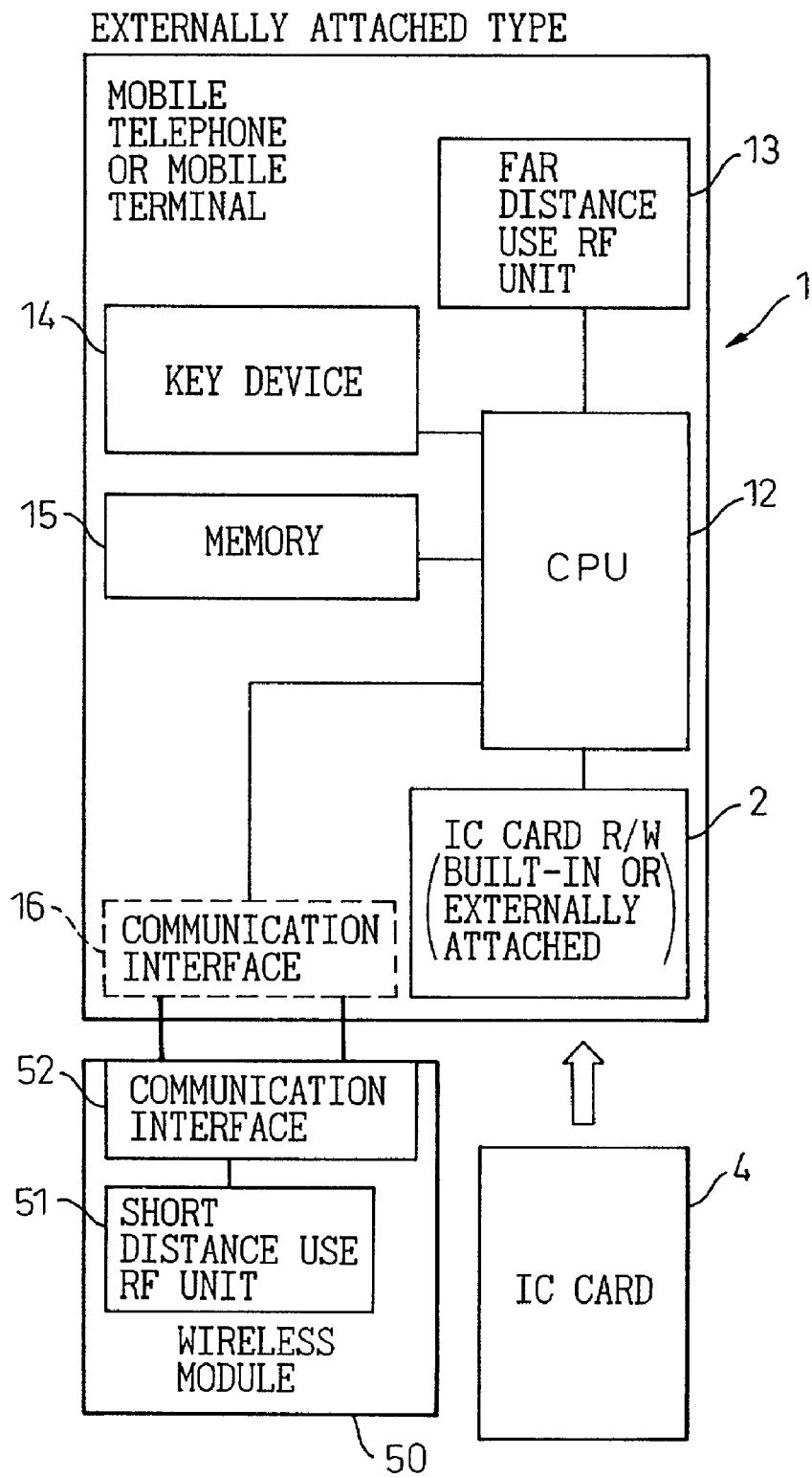
FIG. 11 is a block circuit diagram of an example of an internal configuration of the mobile telephone and the short distance wireless communication module shown FIG. 10.

FIG. 11 shows an embodiment of the internal configuration of the mobile telephone 1 and the mobile module 50 shown FIG. 10. The wireless module 50 is a type externally attached to the mobile telephone 1. Inside the wireless module 50, a short distance use RF unit 51 and a communication interface 52 connected with this and a not illustrated ultra-small sized antenna are installed.

There is a CPU 12 in the body of the mobile telephone 1. This CPU 12 has connected to it the IC card R/W 2, a far distance use RF unit 13, a key device 14 as the input device, a memory 15 such as a RAM or ROM, a communication interface 16, etc. The IC card 4 is inserted into the IC card R/W 2 and the stored data is read. Also, the wireless module 50 is connected with the communication interface 16 of the mobile telephone 1 in its communication interface 52.

Figure 12:
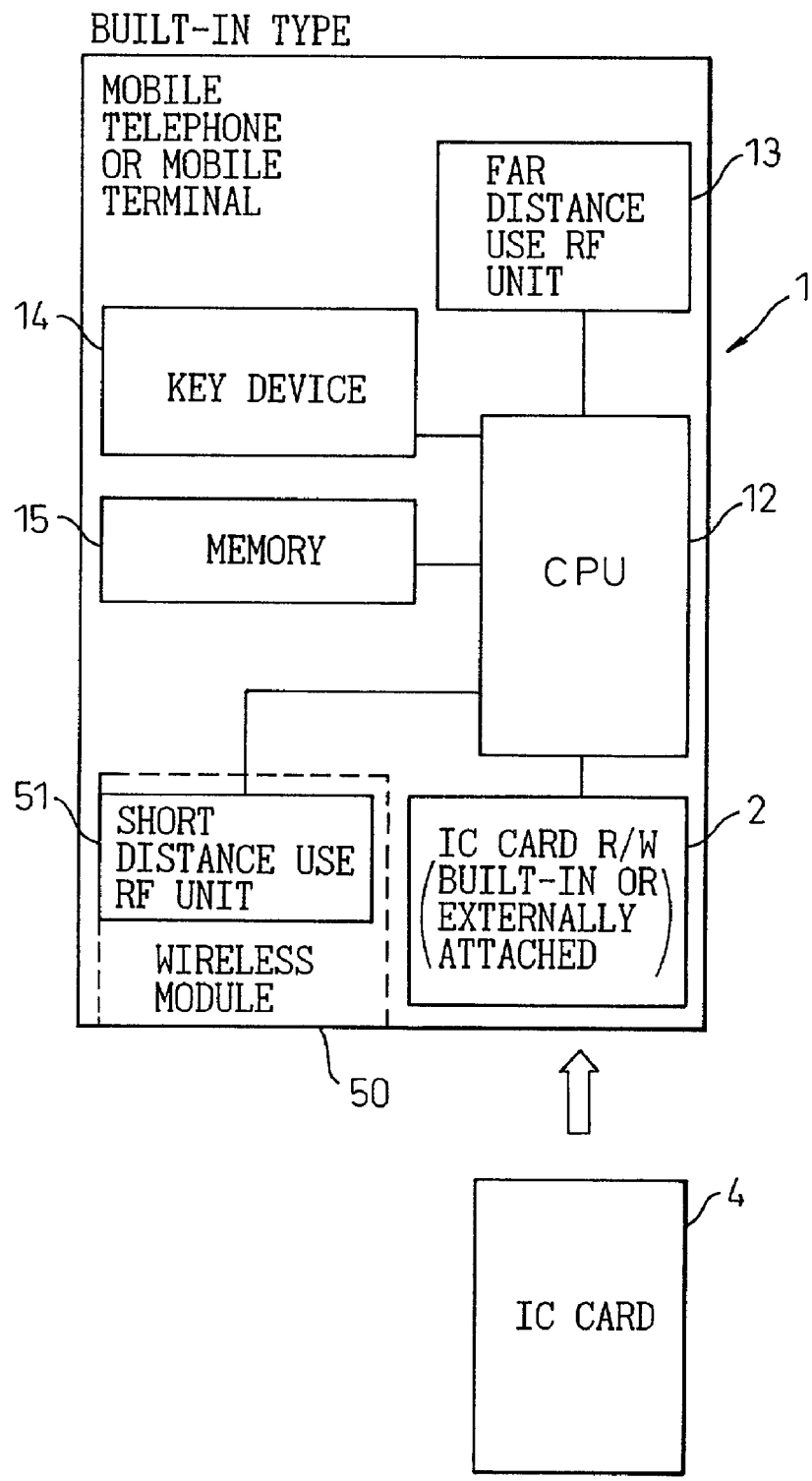
FIG. 12 is a block circuit diagram of another example of the internal configuration of the mobile telephone and the short distance wireless communication module shown FIG. 10.

FIG. 12 shows another embodiment of the internal configuration of the mobile telephone 1 and the wireless module 50 shown FIG. 10. The wireless module 50 is a type built in the mobile telephone 1. Inside the wireless module 50, there are a short distance use RF unit 51 and a not illustrated ultra-small sized antenna. The short distance use RF unit 51 is directly connected with the CPU 12 of the mobile telephone 1. The rest of the configuration of the mobile telephone 1 side is the same as that of FIG. 11, so the same symbols are attached to the same components and an explanation thereof will be omitted.

FIG. 13 is a view of the system configuration of a first embodiment in a third aspect of the card settlement system using a mobile information terminal of the present invention.

In the third aspect, as shown FIG. 13, a wireless module 70 capable of communicating with a wireless module 50 attached to or built in the mobile telephone 1 has to be attached to an existing CAT terminal or debit terminal 30 installed in a business establishment. A CAT terminal or debit terminal 30 to which a wireless module 70 is added will be referred to as a settlement terminal 60 here. The settlement terminal 60 is connected through the settlement network NS with the settlement server 41 of the card company/bank 40.

In such an existing system, in the third aspect of the present invention, the wireless module 50 is necessary in addition to the IC card 4 and the IC card R/W 2 built in or externally attached to the mobile telephone 1 necessary in the first embodiment. Further, the mobile telephone 1 is designed to read/write information with respect to the customer IC card 4. Note that, in the third aspect as well, the mobile telephone 1, built-in or externally attached IC card R/W 2, IC card 4, and the wireless module 50 will be referred to together as the user terminal 10.

Further, in the first embodiment of the third aspect, a service center 20 provided with the application server 21 located between the settlement terminal 60 and the settlement network NS and storing the application software for a specific service etc. is newly provided. This service center 20 is provided with the authorization server 22 for authenticating the IC card 4 and authenticating the customer as the user of this IC card 4 from the information of the customer IC card 4 sent from the settlement terminal 60. The authorization server 22 is provided with the function of checking the validity of the card seen from the settlement application such as the expiration date of the card and presence on a blacklist.

A step-by-step explanation will be given next of the settlement method when a user carrying a mobile telephone 1 provided with an IC card R/W 2 capable of reading his IC card 4 and with the wireless module 50 attached thereto or built therein performs a transaction of purchasing a commodity or a transaction of receiving a predetermined service in a business establishment provided with a settlement terminal 60 provided with the wireless module 70 capable of communicating with this wireless module 50 in a card settlement system using a mobile information terminal comprised as described above. Note that, step numbers shown below coincide with numbers attached to routes indicated by bold lines or a broken line in FIG. 13.

(1) When a customer wants to perform a predetermined transaction in a business establishment, the customer read his IC card 4 into the mobile telephone 1 and connects the wireless module 50 of the user terminal 10 and the wireless module 70 of the settlement terminal 60 of the business establishment. The settlement terminal 60 of the business establishment is connected with the authorization server 22 of the service center 20, therefore the authentication information in the customer IC card 4 is input via the settlement terminal 60 of the business establishment to the authorization server 22 of the service center 20. Namely, the authentication information for confirming the legitimacy of the IC card 4 is transmitted from the user terminal 10 to the authorization server 22 of the service center 20 by being relayed by the settlement terminal 60.

The authorization server 22 requests the input of the personal identification number to the user terminal 10 via the settlement terminal 60 in order to verify the identity of the customer. The customer inputs the personal identification number from the user terminal 10 in response to this request. This personal identification number is transmitted via the settlement terminal 60 to the authorization server 22.

(2) The authorization server 22 authenticates the user terminal and the user based on the authentication information stored in the IC card 4 of the user terminal 10 and the personal identification number input from the user terminal by the customer and transmits the authorization result of the IC card 4 via the business establishment side settlement terminal 60 and the wireless modules 70 and 50 to the user terminal 10.

(3) After the authorization, the IC credit information (or IC debit information) stored in the IC card 4 of the user terminal 10 and the charge and the commodity information at the business establishment are input from the input device of the user terminal 10 by the customer, the data in the IC card is transmitted by the wireless modules 50 and 70 to the CAT terminal or debit terminal 30 of the business establishment, and the validity of the commodity and the charge is examined at the CAT terminal or debit terminal 30.

(4) After the validity is verified, the settlement terminal 60 of the business establishment transmits the IC credit information (or the IC debit information), charge, and commodity information at the business establishment and the business establishment information (business establishment ID) stored in the settlement terminal 60 to the application server 21 of the service center 20.

(5) The application server 21 transfers the IC credit information (or IC debit information), the charge, and the commodity information at the business establishment and the business establishment information received from the user terminal 10 to the settlement server 41 of the card company/bank 40 through the settlement network NS.

(6) The settlement server 41 of the card company/bank 40 examines the validity of the related transaction based on the IC credit information (or IC debit information), the business establishment information, and the charge information at the business establishment received from the authorization server 22, transfers the data to the settlement terminal 60 of the business establishment for a transaction satisfying the settlement conditions, and issues a receipt. The transaction of the customer is completed by this. The receipt is sent from the settlement terminal 60 via the wireless modules 70 and 50 to the user terminal 10 as well.

After an elapse of a predetermined period from the completion of this transaction, in the same way as a usual credit transaction, the customer receives a bill from the card company.

FIG. 14 is a view of the system configuration of a second embodiment in the third aspect of the card settlement system using a mobile information terminal of the present invention.

In the second embodiment of the third aspect, as shown FIG. 14, the wireless module 50 is necessary in addition to the IC card R/W 2 built-in or externally attached to the mobile telephone 1 for reading/writing with respect to the IC card 4. At the same time, it is necessary to attach a wireless module 70 capable of communicating with the wireless module 50 attached to or installed in the mobile telephone 1 to the conventional CAT terminal or debit terminal 30 installed in the business establishment.

In the second embodiment as well, the mobile telephone 1, built-in or externally attached IC card R/W 2, IC card 4, and the wireless module 50 will be referred to together as the user terminal 10. The terminal obtained by adding the wireless module 70 to the CAT terminal or debit terminal 30 will be referred to as the settlement terminal 60. The settlement terminal 60 is connected through the settlement network NS with the settlement server 41 of the card company/bank 40. In the second embodiment, the service center 20 is not provided between the settlement terminal 60 and the settlement network NS. Accordingly, in the second embodiment, both of the settlement server 41 and the authorization server 42 are provided in the card company/bank 40.

A step-by-step explanation will be given using FIG. 14 and FIG. 15 of the settlement method when a user carrying a mobile telephone 1 provided with an IC card R/W 2 capable of reading his IC card 4 and with the wireless module 50 attached thereto or built therein performs a transaction of purchasing a commodity or a transaction of receiving a predetermined service in a business establishment provided with a settlement terminal 60 provided with a wireless module 70 capable of communicating with this wireless module 50 in a card settlement system using a mobile information terminal comprised as described above. Note that, step numbers shown in FIG. 15 coincide with the numbers attached to the routes indicated by the bold lines in FIG. 14.

(1) When a customer wants to perform a predetermined transaction in a business establishment, the customer reads the IC card 4 in the mobile telephone 1 and connects the wireless module 50 of the user terminal 10 and the wireless module 70 of the settlement terminal 60 of the business establishment. The settlement terminal 60 of the business establishment is connected with the authorization server 42 of the card company/bank 40 through the settlement network NS, therefore the authentication information in the customer IC card 4 is input via the settlement terminal 60 of the business establishment to the authorization server 42. Namely, the authentication information for confirming the legitimacy of the IC card 4 is transmitted from the user terminal 10 to the authorization server 42 by the relay of the settlement terminal 60.

The authorization server 42 requests the input of the personal identification number to the user terminal 10 via the settlement terminal 60 in order to verify the identity of the customer. The customer inputs his personal identification number to the user terminal 10 in response to this request. This personal identification number is transmitted via the settlement terminal 60 to the authorization server 42.

(2) The authorization server 42 authenticates the user terminal and the user based on the authentication information stored in the IC card 4 of the user terminal 10 and the personal identification number input from the user terminal by the customer and transmits the authentication result of the IC card 4 via the business establishment side settlement terminal 60 and the wireless modules 70 and 50 to the user terminal 10.

(3) After the authentication, the IC credit information (or IC debit information) stored in the IC card 4 of the user terminal 10 and the charge and the commodity information at the business establishment are input from the input device of the user terminal 10 by the customer, the data in the IC card are transmitted by the wireless modules 50 and 70 to the settlement terminal 60 of the business establishment, and the validity of the commodity and the charge thereof is examined at the settlement terminal 60.

(4) After the validity is verified, the settlement terminal 60 of the business establishment transmits the IC credit information (or the IC debit information), charge, and commodity information at the business establishment and the business establishment information (business establishment ID) stored in the settlement terminal 60 to the settlement server 41 of the card company/bank 40.

(5) The settlement server 41 of the card company/bank 40 examines the validity of the related transaction based on the IC credit information (or IC debit information), business establishment information, and the charge information at the business establishment received from the settlement terminal 6 and transmits the authorization of the IC card data and the settled result and the receipt to the settlement terminal 60 of the business establishment for transactions satisfying the settlement conditions.

(6) The settlement terminal 60 transmits the settlement result and the receipt to the user terminal 10, whereby the transaction of the customer is completed.

After an elapse of a predetermined period from the completion of this transaction, in the same way as a usual credit transaction, the customer receives a bill from the card company.

FIG. 16 shows an example of application of the third aspect of the card settlement system using a mobile information terminal of the present invention. As mentioned above, when Bluetooth is used in the wireless module 50, the apparatuses confirm each other by issuing short signals, thus up to a maximum of seven apparatus can be wirelessly connected. Accordingly, in one business establishment, if one settlement terminal 60 is provided as the master, the transaction can be carried out with up to seven user terminals 10A to 10G provided with wireless modules 50A to 50G as slaves. In this case, in order to identify the user terminals 10A to 10G, identification codes A to G are added to the communication among the wireless modules.

In this way, in the third aspect as well, the information required for the settlement is input from the user terminal. Therefore, this is effective against leakage of information. Since an IC card is used for storing the card settlement information of the user, the benefit of the security of the IC card can be received and it is possible to prevent illicit transactions. Also, in the third aspect, simultaneous connection from a plurality of user terminals is enabled and the processing can be carried out in parallel, therefore a reduction of the number of the devices of the settlement terminal in the business establishment and a shortening of the waiting time for settlement of the customer can be realized and a reduction of equipment and a higher efficiency of the processing can be achieved.

Note that, in the above embodiments, embodiments of a mobile telephone were explained as the mobile information terminal, but similar settlement is possible even if a mobile computer which can be connected with a network such as the Internet is used in place of the mobile telephone.

While the invention has been described with reference to specific embodiment chosen for purpose of illustration, it should be apparent that numerous modifications could be made thereto by those skilled in the art without departing from the basic concept and scope of the invention.

What is claimed is:

1. A card settlement method using a mobile information terminal provided with an IC card read/write function and a wireless communication function for the settlement of a transaction in a business establishment, comprising:
    a step of having a customer using a business establishment wirelessly connect to an authorization server through a network by the mobile information terminal,
    a step of having the customer load his or her IC card in the mobile information terminal, read the information stored in this IC card, and send it to the authorization server,
    a step of having the authorization server decide on the authorization of the current transaction from authentication information stored in the IC card and proving the legitimacy of the card, settlement information containing at least a card number, and personal identification information input from the customer and proving the legitimacy of the customer,
    a step of sending a temporary password issued from a settlement server to the mobile information terminal for display after the authorization of the current transaction,
    a step of inputting the temporary password and the current transaction information from a business establishment side settlement terminal and sending it to the settlement server, and
    a step of having the settlement server settle the transaction with the password and the transaction information satisfying the settlement conditions,
    wherein the temporary password is valid for only one transaction and valid for only a limited period of time,
    wherein the mobile information terminal is a mobile phone having both a contact type IC card and a noncontact type IC card built into the mobile telephone,
    wherein the temporary password is data obtained by encrypting said settlement information and said temporary password and is not stored in said settlement server.

2. A card settlement system using a mobile information terminal as set forth in claim 1, wherein, further, after said settlement is executed by said settlement server, a receipt is issued from said settlement terminal on business establishment side.

3. A card settlement system using a mobile information terminal as set forth in claim 2, wherein when the receipt is issued from said settlement terminal of a business establishment by said settlement server, the settlement result is displayed on also a display unit of said mobile information terminal via said application server.

4. A card settlement system wherein a settlement terminal installed in a business establishment is connected through a settlement network with an authorization server and a settlement server retained by a card company or a bank, and a customer can perform the settlement by using a card, providing following means of:
    an application server provided in the mobile information terminal, and providing a read/write function of an IC card for performing a read/write operation of information with respect to the IC card with authentication information proving a legitimacy of the card, personal identification information proving the legitimacy of the customer and settlement information containing at least a card number stored therein,
    a storage of an application software for a specific service, a control of a screen of said mobile information terminal and a gateway function between the network of said mobile information terminal and said settlement network, and
    a password issuance function provided in said settlement server issuing a temporary password based on settlement information input from said IC card through the network of said mobile information terminal, said application server and said settlement network,
    wherein the temporary password is valid for only one transaction and valid for only a limited period of time,
    wherein the mobile information terminal is a mobile phone having both a contact type IC card and a noncontact type IC card built into the mobile telephone,
    wherein the temporary password is data obtained by encrypting said settlement information and said temporary password and is not stored in said settlement server.

5. A card settlement system using a mobile information terminal as set forth in claim 4, wherein the settlement is carried out by the following procedure when a customer incurs a charge at a business establishment:
    said mobile information terminal with said IC card inserted therein by the customer is connected via said application server with said authorization server, and the authentication information stored in this IC card is transmitted to said authorization server,
    legitimacy of this IC card is decided by said authorization server based on the authentication information stored in said IC card,
    the personal identification information is input from the input device of said mobile information terminal by the customer and sent to said authorization server after it is verified that said card is legitimate,
    the settlement information stored in said IC card is input by the customer and sent to said settlement server after the customer is verified by the personal identification information, a temporary password issued from said settlement server based on said personal identification information, settlement information, and reception time is sent to said mobile information terminal and displayed on a display unit thereof, the displayed temporary password and this time sales information are input from said settlement terminal installed in said business establishment, and a receipt is issued from said settlement terminal of the business establishment by a signal from said settlement server for a transaction satisfying the settlement conditions after said temporary password and transaction information are checked by said settlement server.

6. A card settlement system using a mobile information terminal as set forth in claim 4, wherein said application server is provided in a service center located between the network of said mobile information terminal and said settlement network, and said authorization server is provided in this service center.

7. A card settlement system using a mobile information terminal as set forth in claim 4, wherein the authentication function corresponding to said authorization server is provided in said mobile information terminal, and the authentication of legitimacy of said IC card is carried out in said mobile information terminal.

8. A card settlement system using a mobile information terminal as set forth in claim 4, wherein as the authentication of the user by said personal identification information, bio information such as a fingerprint, voiceprint, and retina print of the user is registered in the IC card in advance by a bio information reader, the bio information is read at the time of authentication of the user by this bio information reader and compared with the bio information in the IC card, and the user is thereby verified.

9. A card settlement system using a mobile information terminal as set forth in claim 4, wherein specific information concerning a matter known to only the user is registered in the IC card in advance as the authentication of the user by said personal identification information, the user inputs this specific information at the time of authentication of the user, this is compared with the specific information in the IC card, and the user is thereby verified.

10. A card settlement system using a mobile information terminal as set forth in claim 4, wherein a read/write function of the IC card is externally given to said mobile information terminal.

11. A card settlement system using a mobile information terminal as set forth in claim 4, wherein a read/write function of the IC card is built-in said mobile information terminal.

12. A card settlement system using mobile information terminal as set forth in claim 4, wherein said mobile information terminal is a mobile telephone.

\* \* \* \* \*